(12) United States Patent
Jan et al.

(10) Patent No.: US 11,457,771 B2
(45) Date of Patent: Oct. 4, 2022

(54) PACKABLE MODULAR COMBUSTION GRILL

(71) Applicant: Frontline Advance, LLC, Southlake, TX (US)

(72) Inventors: Eric H. Jan, Lehi, UT (US); Alexander K. Maghsadi, Lewisville, TX (US)

(73) Assignee: Solo Brands, LLC, Grapevine, TX (US)

(*) Notice: Subject to any disclaimer, the term of this patent is extended or adjusted under 35 U.S.C. 154(b) by 275 days.

(21) Appl. No.: 16/816,043

(22) Filed: Mar. 11, 2020

(65) Prior Publication Data

US 2021/0282592 A1 Sep. 16, 2021

(51) Int. Cl.
*A47J 37/07* (2006.01)

(52) U.S. Cl.
CPC ....... *A47J 37/0763* (2013.01); *A47J 37/0704* (2013.01); *A47J 37/079* (2013.01); *A47J 2201/00* (2013.01)

(58) Field of Classification Search
CPC .. A47J 37/0704; A47J 37/079; A47J 37/0763; A47J 2201/00
See application file for complete search history.

(56) References Cited

U.S. PATENT DOCUMENTS

| | | | |
|---|---|---|---|
| 685,194 | A | 10/1901 | Young |
| 904,188 | A | 11/1908 | Engle |
| 1,298,762 | A | 4/1919 | Milligan |
| D54,930 | S | 4/1920 | Knapp |
| D74,996 | S | 4/1928 | Wolcott |
| 1,694,175 | A | 12/1928 | Hauser |
| D100,012 | S | 6/1936 | Ford |
| 2,614,553 | A | 10/1952 | Cox |
| 2,722,883 | A | 11/1955 | Rignell |

(Continued)

FOREIGN PATENT DOCUMENTS

| | | |
|---|---|---|
| CN | 2035756 | 4/1989 |
| JP | 10-323289 A | 12/1998 |

(Continued)

OTHER PUBLICATIONS

Solo Stove, webpage capture: https://www.solostove.com/solo-stove-bonfire, 2017, 8 pages.

(Continued)

*Primary Examiner* — Alfred Basichas
(74) *Attorney, Agent, or Firm* — Haynes and Boone, LLP

(57) ABSTRACT

A grill stove includes a kettle, legs, and a lid. The kettle includes an outer wall with a ventilation aperture, an inner wall, and a top collar extending between the inner wall and the outer wall and connecting the top portion of the outer wall to the top portion of the inner wall to form a dual-walled kettle. A base pan may be attached to the outer wall and may form a bottom of the kettle. A nest pan may have an edge and a ventilation aperture. The edge of the nest pan may be attached to the bottom portion of the inner wall and disposed above the base pan. The nest pan and the base pan being spaced apart to form a gap therebetween. The ventilation aperture of the nest pan may be in fluid communication with the ventilation aperture of the outer wall. An ash pan may be removably positionable above the nest pan.

22 Claims, 26 Drawing Sheets

(56) References Cited

U.S. PATENT DOCUMENTS

| | | | |
|---|---|---|---|
| 2,738,225 A | 3/1956 | Meek | |
| D196,018 S | 8/1963 | Palmer et al. | |
| 3,756,218 A | 9/1973 | Simpson | |
| D229,013 S | 11/1973 | Storandt | |
| D229,277 S | 11/1973 | Chan | |
| 3,790,081 A | 2/1974 | Thornton | |
| 3,937,138 A | 2/1976 | Tidwell | |
| 3,951,082 A | 4/1976 | Leggett et al. | |
| D258,259 S | 2/1981 | Lindholm | |
| D258,712 S | 3/1981 | Jacobson | |
| 4,432,334 A * | 2/1984 | Holt | A47J 37/0694 99/449 |
| D273,264 S | 4/1984 | Elliston | |
| 4,735,135 A | 4/1988 | Walker | |
| 4,903,683 A | 2/1990 | Larsen | |
| 4,909,235 A * | 3/1990 | Boetcker | A47J 37/0704 126/25 C |
| 5,024,208 A | 6/1991 | Hottenroth et al. | |
| 5,117,558 A | 6/1992 | Hull | |
| D355,809 S | 2/1995 | Kothrade | |
| D358,204 S | 5/1995 | Ferrier | |
| 5,490,452 A | 2/1996 | Schlosser et al. | |
| D379,900 S | 6/1997 | Gillam | |
| 5,638,808 A | 6/1997 | Home | |
| 5,651,356 A | 7/1997 | Kaines | |
| 5,797,386 A | 8/1998 | Orr | |
| 5,809,988 A | 9/1998 | Wagner | |
| 5,832,915 A * | 11/1998 | Skidmore | A47J 37/0763 126/25 R |
| 6,024,081 A | 2/2000 | Libertini | |
| D422,452 S | 4/2000 | Persson | |
| D435,191 S | 12/2000 | Cooper | |
| 6,196,121 B1 | 3/2001 | Crowl | |
| 6,196,215 B1 | 3/2001 | Chandaria | |
| D442,422 S | 5/2001 | Dabney | |
| D444,991 S | 7/2001 | Measom | |
| 6,314,955 B1 | 11/2001 | Boetcker | |
| 6,393,717 B1 | 5/2002 | Santos et al. | |
| 6,488,023 B2 | 12/2002 | Pecoskie | |
| D488,023 S | 4/2004 | Siegel et al. | |
| D491,409 S | 6/2004 | Siegel et al. | |
| D495,552 S | 9/2004 | Siegel et al. | |
| D531,849 S | 11/2006 | Turner | |
| D534,756 S | 1/2007 | Jensen | |
| D607,265 S | 1/2010 | Gaunaurd, III | |
| D612,191 S | 3/2010 | Taber et al. | |
| D612,662 S | 3/2010 | Lorenz et al. | |
| D618,038 S | 6/2010 | Davies et al. | |
| 7,810,484 B2 | 10/2010 | Schlosser et al. | |
| D644,474 S | 9/2011 | Wilgus et al. | |
| 8,087,410 B2 | 1/2012 | Gregory | |
| D658,426 S | 5/2012 | Saunders | |
| D683,999 S | 6/2013 | Karlsson | |
| D701,721 S | 4/2014 | Jan | |
| 9,844,300 B2 | 12/2017 | Cedar et al. | |
| 10,098,502 B2 | 10/2018 | Ohler | |
| 10,125,995 B2 | 11/2018 | Kohli | |
| 10,222,092 B1 | 3/2019 | Traeger | |
| D858,729 S | 9/2019 | Scott | |
| D923,163 S | 6/2021 | Jan | |
| 11,092,342 B2 | 8/2021 | Harrington et al. | |
| 2006/0219233 A1 | 10/2006 | Sorenson et al. | |
| 2007/0137634 A1 | 6/2007 | Traeger et al. | |
| 2009/0165772 A1 | 7/2009 | Hunt et al. | |
| 2010/0043775 A1 | 2/2010 | Phillips et al. | |
| 2011/0180527 A1 | 7/2011 | Abbott | |
| 2012/0017884 A1 | 1/2012 | Van Den Hoff | |
| 2014/0007778 A1 | 1/2014 | Marks | |
| 2014/0026765 A1 | 1/2014 | Fou | |
| 2014/0165993 A1 | 6/2014 | Ahmed | |
| 2014/0238378 A1 | 8/2014 | Scott | |
| 2015/0068512 A1 | 3/2015 | Mehler et al. | |
| 2015/0110939 A1 | 4/2015 | Benson et al. | |
| 2015/0211743 A1 | 7/2015 | DeFoort et al. | |
| 2017/0363325 A1 | 12/2017 | Diurlin et al. | |
| 2019/0313851 A1 | 10/2019 | Shemp | |
| 2020/0309369 A1 | 10/2020 | Jan | |
| 2021/0018180 A1 | 1/2021 | Jan et al. | |
| 2021/0048188 A1 | 2/2021 | Harrington et al. | |
| 2021/0199301 A1 | 7/2021 | Poggi et al. | |
| 2021/0274970 A1 | 9/2021 | Stoltzfus | |

FOREIGN PATENT DOCUMENTS

| | | |
|---|---|---|
| JP | 2000-342462 | 12/2000 |
| JP | 2003-190011 A | 7/2003 |
| KR | 20-0295935 | 11/2002 |
| KR | 10-0898493 | 5/2009 |

OTHER PUBLICATIONS

International Search Authority, International Search Report and Written Opinion, for PCT/US2019/063180, dated Mar. 26, 2020, 10 pages.

International Search Authority, International Search Report and Written Opinion, for PCT/US2021/020687, dated Aug. 5, 2021, 11 pages.

Screen captures from YouTube video clip entitled "Solo Stove Bonfire: Best Gear of 2017," 4 pages, uploaded on May 14, 2017 by user "Canadian Prepper". Retrieved from Internet: https://www.youtube.com/watch?v=Vo_J_flWq5g.

Camping stove, https://www.kickstarter.com/projects/340672218/solo-stove-campfire-backpack-camp-survive/description, 21 pages (2014).

* cited by examiner

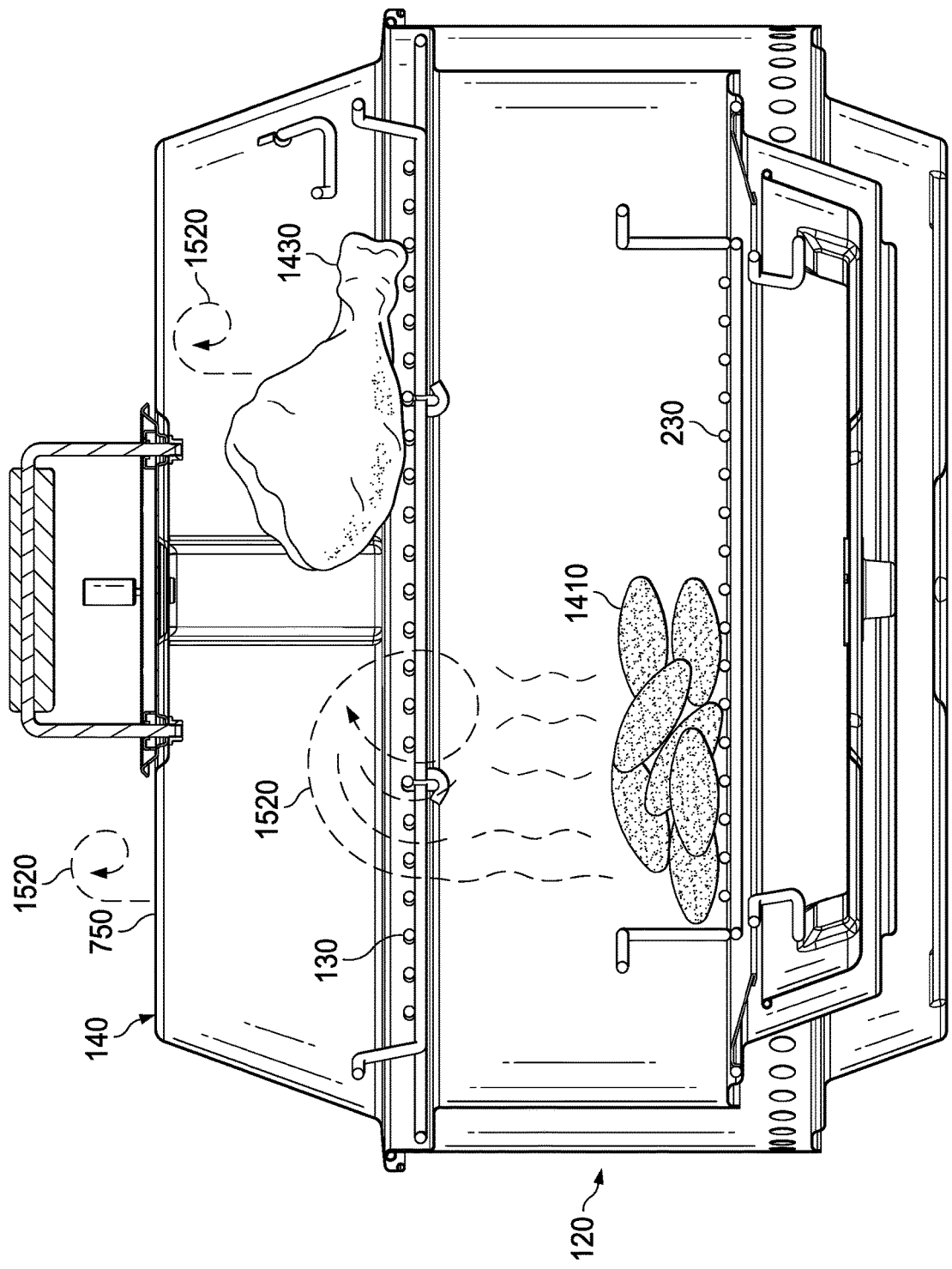

PACKABLE MODULAR COMBUSTION GRILL

TECHNICAL FIELD

The subject matter described herein relates to a combustible fuel burning grill stove with modular components. This grill stove has particular but not exclusive utility for outdoor cooking.

BACKGROUND

Portable, fixed, and semi-fixed grills are used for example in camping, in residential back yards, or other locations to cook meats, vegetables, and other foods. Stoves (including grills, defined herein as a type of stove) may employ different fuels, including but not limited to logs, sticks, twigs, straw, paper, cardboard, wood shavings, or pellets, which may be supplemented with combustion accelerants such as natural gas, butane, propane, kerosene, or lighter fluid, and may include binders such as beeswax or paraffin. For many applications, charcoal may be a preferred fuel, as it can burn relatively slowly and can provide a relatively even distribution of heat as compared with other fuels. However, users may not be aware of the correct amount of fuel to use for different cooking tasks, how to ignite the fuel safely, or how to position foods relative to the fuel.

The dimensions and construction of grills may make them difficult to move or store. Because cooking surfaces are typically at an accessible height above the ground (e.g., waist-high), some grills may be top-heavy and fall over easily when bumped or subjected to wind force. Grill materials may be subject to significant heat and weathering, and may therefore experience oxidation or warpage that limit their service life, affect their aesthetic appearance, and may in some circumstances cause structural failure with additional attendant fire risk. Utensils and/or lids can become coated with oil and other materials during use or may become dangerously hot. Utensils and lids that touch the ground or other surfaces may become contaminated or may present a risk of fire or risk of burn injury. When the grill's cooking surface is heated to cooking temperatures, users may find it difficult to remove the cooking surface to access the fuel (e.g., to rearrange coals) without risk of fire or injury.

Cooking with a closed grill (e.g., under a grill lid) may prevent adequate air flow required to support full and even combustion of the fuel. Improper use of a grill may result in improperly cooked food and/or the risk of fire or injury. Emptying ashes and un-combusted fuel from a grill may be labor-intensive and messy.

It should therefore be appreciated that commonly used grills have numerous drawbacks, including one or more of low portability, poor combustion performance, poor cooking performance, short service life, smoke generation, fire risk, safety risk, contamination risk, and aesthetic degradation, among others. Accordingly, long-felt needs exist for grills that address one or more of the forgoing or other concerns.

The information included in this Background section of the specification, including any references cited herein and any description or discussion thereof, is included for technical reference purposes only and is not to be regarded as subject matter by which the scope of the disclosure is to be bound.

SUMMARY

Disclosed is a packable modular combustion grill. The packable modular combustion grill may include combinations of a grill body, a grill lid, a grill stand, a utensil hanger, and fuel packs. Some example implementations of the grill body may include a doubled-walled body design, a coal grate to support combustible fuel, a grill grate cooking surface, an ash pan, and a base pan spaced from the ash pan by an air gap. The grill grate may be hinged to allow access to the fuel while the grill is in operation. The grill lid may include tapered sides and a flat top, with a handle, heat shield, closeable vent, and a lid hanger configured to hang the lid from the grill body. The utensil hanger may include brackets to hang the utensil hangar from the grill body, and utensil hooks to hang utensils from the utensil hanger. The grill stand may include three legs attached together at the top center and bottom center, forming a shelf to support the grill body. The fuel packs may include a combustible wrapper sized and shaped to cover a specified portion of the coal grate, text and graphical instructions, a quantity of combustible fuel sized to facilitate particular cooking tasks, and one or more fire lighters capable of burning with an open flame for a period of time. The packable modular combustion grill may be storable, such that the lid can be inverted and stored inside the grill body, and the legs removed from the stand, to reduce the volume of the packable modular combustion grill.

The packable modular combustion grill disclosed herein has particular, but not exclusive, utility for outdoor cooking. For example, cooking may be done in yards, parks, campsites, or other areas.

One general aspect of the packable modular combustion grill includes a grill stove comprising a kettle that includes: an outer wall including a top portion with a top edge, a bottom portion width a bottom edge, and a ventilation aperture, an inner wall including a top portion with a top edge and a bottom portion with a bottom edge, a top collar extending between the inner wall and the outer wall, the top collar connecting the top portion of the outer wall to the top portion of the inner wall, the inner wall and the outer wall being spaced apart to form a gap therebetween, a base pan attached to the outer wall and forming a bottom of the kettle, and a nest pan having an edge and a ventilation aperture, the edge of the nest pan being attached to the bottom portion of the inner wall and disposed above the base pan, the nest pan and the base pan being spaced apart to form a gap therebetween, the ventilation aperture of the nest pan being in fluid communication with the ventilation aperture of the outer wall; an ash pan removably positionable above the nest pan; and a coal grate removably disposed above the ash pan and the nest pan.

Implementations may include one or more of the following features. The grill stove where the inner wall further includes a top lip positioned at an outer perimeter of the top collar. The grill stove where a height of the inner wall is less than a height of the outer wall, and where the ventilation aperture of the outer wall includes a plurality of apertures positioned within the outer wall at an elevation lower than the bottom edge of the inner wall. The grill stove where the ventilation aperture of the nest pan includes a central opening in a bottom surface of the nest pan. The grill stove where at least one of the ash pan, the nest pan, or the base pan includes radial embossed features. The grill stove where at least some of the radial embossed features are configured to nest with features of a grill stand. The grill stove where the outer wall, inner wall, base pan, nest pan, ash pan, and coal grate include stainless steel. The grill stove where the coal grate includes at least one handle, a downward-sloping funnel rim, and a grating. The grill stove where the base pan includes a bottom and sides extending upwardly from the bottom.

One general aspect includes a grill stove that includes an outer wall including a top portion having a top edge, a bottom portion having a bottom edge, and a plurality of ventilation apertures disposed along the bottom portion, the outer wall having a first height and defining a central axis and being circular in a cross-section perpendicular to the central axis; an inner wall including a top portion having a top edge and a bottom portion having a bottom edge, the inner wall being coaxial with the outer wall and being devoid of ventilation apertures, the inner wall having a second height less than the first height, the inner wall defining a central chamber; a bottom attached to the outer wall and forming a bottom of the grill stove, and a top collar extending laterally between the inner wall and the outer wall, the top collar connecting the top portion of the outer wall to the top portion of the inner wall, the inner wall and the outer wall being spaced apart to form a gap therebetween, the ventilation apertures being in communication with the gap and in communication with the central chamber.

Implementations may include one or more of the following features. The grill stove where the top collar is a flange extending radially from the inner wall to the top portion of the outer wall. The grill stove where the bottom includes a plurality of grooves shaped to receive legs of a grill stand. The grill stove including a grill stand having substantially horizontal support arms, the bottom being configured to rest on the support arms. The grill stove including: a fuel grate for supporting a fuel for heating a grill, and a funnel disposed below the grate, the funnel having a central opening for passage of burnt fuel and configured to the burnt fuel radially inward toward the central axis. The grill stove including an ash pan having a width wider than a width of the central opening of the funnel. The grill stove including a nest pan having an edge and a central ventilation aperture, the edge of the nest pan being attached to the bottom portion of the inner wall and disposed above the bottom, the nest pan and the bottom being spaced apart to form a gap therebetween, the ventilation aperture of the nest pan being in fluid communication with the ventilation aperture of the outer wall. The grill stove including a grill grate disposed above the fuel grate, the grill grate including an access door and a handle for opening the access door to provide access to the central chamber.

One general aspect includes a grill stove including an inner wall and a floor portion defining a central chamber; a removable fuel grate in the central chamber and disposed above the floor portion to support a fuel for heating the grill stove, and a removable funnel in the central chamber disposed below the fuel grate, the funnel having a central opening for passage of burnt fuel and configured to direct the burnt fuel radially inwardly, the central opening having a first width; and an ash pan disposed in the central chamber below the funnel, the ash pan having an opening for receiving burnt fuel, the opening having a second width larger than the first width.

Implementations may include one or more of the following features. The grill stove where the removable funnel is fixed to and removable from the central chamber with the fuel grate. The grill stove where the fuel grate includes a handle for grasping by a user and the ash pan includes a handle for grasping by a user. The grill stove including a lid sized to be inverted and received in the central chamber for storage. The grill stove where the inner wall is cylindrical.

One general aspect includes a grill stove that includes a kettle; and a grate in an opening of the kettle, the grate including: outer support ring; a stationary grate portion fixedly attached to the outer support ring; a pivotable grate portion attached to the stationary grate portion; a hinge connecting the pivotable grate portion to the stationary portion or the outer support ring; and an upward-facing handle attached to the pivotable grate portion.

Implementations may include one or more of the following features. The grill stove where the stationary grate portion includes a plurality of bars, and the hinge includes a loop extending around one of the bars of the stationary grate portion. The grill stove where the stationary grate portion includes a central region of the grate, and the pivotable grate portion is a first pivotable grate portion disposed on a first side of the stationary portion, and the grate further includes a second pivotable grate portion disposed on an opposing second side of the stationary portion.

One general aspect includes a grill stove stand including a plurality of legs arranged to support a grill stove body, each leg including: a lateral portion having an outer end and an inner end; a foot pad coupled to the lateral portion; an upright portion coupled to the outer end of the lateral portion and having an oblique angle; a shelf portion having an outer end and an inner end; a bumper portion disposed at the outer end of the shelf portion and extending above the shelf portion; and a bottom yoke coupled to the inner ends of the lateral portions of the plurality of legs; and a top yoke coupled to the inner ends of the shelf portions of the plurality of legs.

Implementations may include one or more of the following features. The grill stove stand where the plurality of legs includes three legs. The grill stove stand where the lateral portion, upright portion, and shelf portion are hollow. The grill stove stand where the upright portion forms an oblique angle such that a top portion of the upright portion is closer to a center of the grill stove stand than a bottom portion of the upright portion. The grill stove stand where each leg of the plurality of legs has a width between about 0.5 and three inches, the legs being arranged to stack on top of each other when the grill stove stand is in a disassembled condition.

One general aspect includes a grill stove fuel pack system for providing fuel quantities and distributions respectively corresponding to different types of food to be cooked on a fuel burning grill stove. The grill stove fuel pack system also includes a first combustible bag sized and shaped to lay on a fuel grate of a grill stove, the first combustible bag having an outer surface and having a first food pictogram on the outer surface thereof, the first food pictogram representing a specific first food to be cooked on the grill stove, the first combustible bag including a first specific quantity and distribution of fuel selected to correspond to cooking requirements for the specific food represented by the first food pictogram; and a second combustible bag sized and shaped to lay on the fuel grate of the grill stove, the second combustible bag having an outer surface and having a second food pictogram on the outer surface thereof, the second food pictogram being different than the first food pictogram, the second food pictogram representing a specific second food to be cooked on the grill stove having different cooking requirements than the specific first food, the second combustible bag including a second specific quantity and distribution of fuel selected to correspond to cooking requirements for the specific second food represented by the second food pictogram.

Implementations may include one or more of the following features. The grill stove fuel pack system where the first combustible bag is shaped to be used in a cylindrical central chamber of the grill stove, the first combustible bag having an edge shaped to be concentric with a wall of the cylindrical central chamber. The grill stove fuel pack system where the first food pictogram representing a specific first food to be cooked on the grill stove includes a food pictogram of ribs, fish, or poultry, and where the second food pictogram representing a specific second food to be cooked on the grill stove includes a food pictogram of steak, burger, sausage, or kebab. The grill stove fuel pack system where the first specific quantity of fuel is between about 40 and 60% of the quantity of the second specific quantity of fuel. The grill stove fuel pack system where the first specific quantity of fuel is between about 90% and 110% of the second specific quantity of fuel. The grill stove fuel pack system where the first combustible bag is shaped in a semi-circle, and the second combustible bag is shaped as a disc. The grill stove fuel pack system where the first combustible bag is sized to cover about 40 to 60% of a fuel grate in the grill stove, and the second combustible bag is sized to cover about 80-100% of the fuel grate in the grill stove. The grill stove fuel pack system where the first combustible bag and the second combustible bag are each formed of paper, burlap, or cloth. The grill stove fuel pack system including a combustible fire lighter to be disposed in the grill stove to ignite the first or the second combustible bag.

One general aspect includes a grill stove fuel pack including a closed, combustible bag sized and shaped to lay flat to cover a particular portion of a coal on a fuel grate of a grill stove; a quantity of combustible fuel pre-selected to cover the particular portion of the coal grate, and disposed within the combustible bag such that the quantity of combustible fuel covers the particular portion of the coal grate without rearrangement of the combustible fuel during burning; at least one pictogram positioned on a surface of the combustible bag and indicative of a specific types of food to be cooked by the quantity of combustible fuel; and at least one combustible fire lighter capable of burning with an open flame for a period of time, and positionable beneath the coal grate, such that ignition of the at least one fire lighter beneath the coal grate causes ignition of the combustible bag and the combustible fuel.

Implementations may include one or more of the following features. The grill stove fuel pack where the particular portion of the coal grate includes between 90% and 100% of the coal grate, where the closed, combustible bag is circular or square, and where the at least one pictogram includes an image of a steak, burger, sausage or kebab. The grill stove fuel pack where the particular portion of the coal grate includes between 40% and 60% of the coal grate, where the closed, combustible bag is semicircular or rectangular, and where the at least one pictogram includes an image of ribs, fish, or poultry.

One general aspect includes a grill stove lid, which includes a horizontal top portion; an insulating handle fixedly attached to the horizontal top portion; a tapered portion fixedly attached to an outer rim of the top portion and angled between 2 degrees and 45 degrees from vertical; a bottom collar fixedly attached to an outer rim of the tapered portion; and a bottom lip fixedly attached to an outer rim of the bottom collar.

Implementations may include one or more of the following features. The grill stove lid further including: a vent opening disposed within the horizontal top portion; a vent cover rotatably attached to the horizontal top portion; and an insulating vent cover handle fixedly attached to the vent cover, such that rotating the vent cover through 360 degrees using the vent cover handle alternately covers and uncovers the vent opening. The grill stove lid further including: a heat shield fixedly attached to the horizontal top portion beneath the insulating handle. The grill stove lid where the vent cover and heat shield include stainless steel. The grill stove lid where the horizontal top portion, tapered portion, bottom collar, and bottom lip include powder coated stainless steel. The grill stove lid where at least one of the tapered portion or the horizontal top portion includes radial embossed features.

One general aspect includes a grill stove utensil hanger. The grill stove utensil hanger also includes a single sheet of metal material stamped and shaped to form a utensil hanger main body configured to nest against a portion of a grill stove body, the main body having an arc shaped to match a cylindrical shape of the grill stove body, the single sheet of material also including a plurality of hooks bent to project outwardly from the main body for supporting utensils; and a plurality of brackets attached to and extending from an upper portion of the main body, the brackets configured to removably hang the utensil hanger main body from a top lip of the grill stove body.

Implementations may include one or more of the following features. The grill stove utensil hanger where the plurality of brackets is fixedly attached to the main body. The grill stove utensil hanger where the utensil hanger main body is curved such that a top lip of the utensil hanger main body and a bottom lip of the utensil hanger main body fit flush against a portion of a circular grill stove body. The grill stove utensil hanger where the utensil hook includes three utensil hooks.

Some aspects of the present disclosure are directed to a grill stove fuel pack system for providing fuel distributions respectively corresponding to different types of food to be cooked on a fuel burning grill stove. The system may include a first combustible bag sized and shaped to lay on a fuel grate of a grill stove, the first combustible bag having an outer surface and having a first food pictogram on the outer surface thereof. The first food pictogram may represent a specific first food to be cooked on the grill stove. The first combustible bag may be shaped to distribute fuel selected to correspond to cooking requirements for the specific food represented by the first food pictogram. A second combustible bag may be sized and shaped to lay on the fuel grate of the grill stove. The second combustible bag may have an outer surface and having a second food pictogram on the outer surface thereof. The second food pictogram may be different than the first food pictogram, and the second food pictogram may represent a specific second food to be cooked on the grill stove having different cooking requirements than the specific first food. The second combustible bag may comprise a shape to distribute fuel selected to correspond to cooking requirements for the specific second food represented by the second food pictogram.

This Summary is provided to introduce a selection of concepts in a simplified form that are further described below in the Detailed Description. This Summary is not intended to identify key features or essential features of the claimed subject matter, nor is it intended to limit the scope of the claimed subject matter. A more extensive presentation of features, details, utilities, and advantages of the packable modular combustion grill, as defined in the claims, is provided in the following written description of various embodiments of the disclosure and illustrated in the accompanying drawings.

BRIEF DESCRIPTION OF THE DRAWINGS

Illustrative embodiments of the present disclosure will be described with reference to the accompanying drawings, of which:

FIG. 17 is a diagrammatic, cross-sectional view of an indirect-heat cooking process using an example packable modular combustion grill, in accordance with at least one embodiment of the present disclosure.

Figure 1:
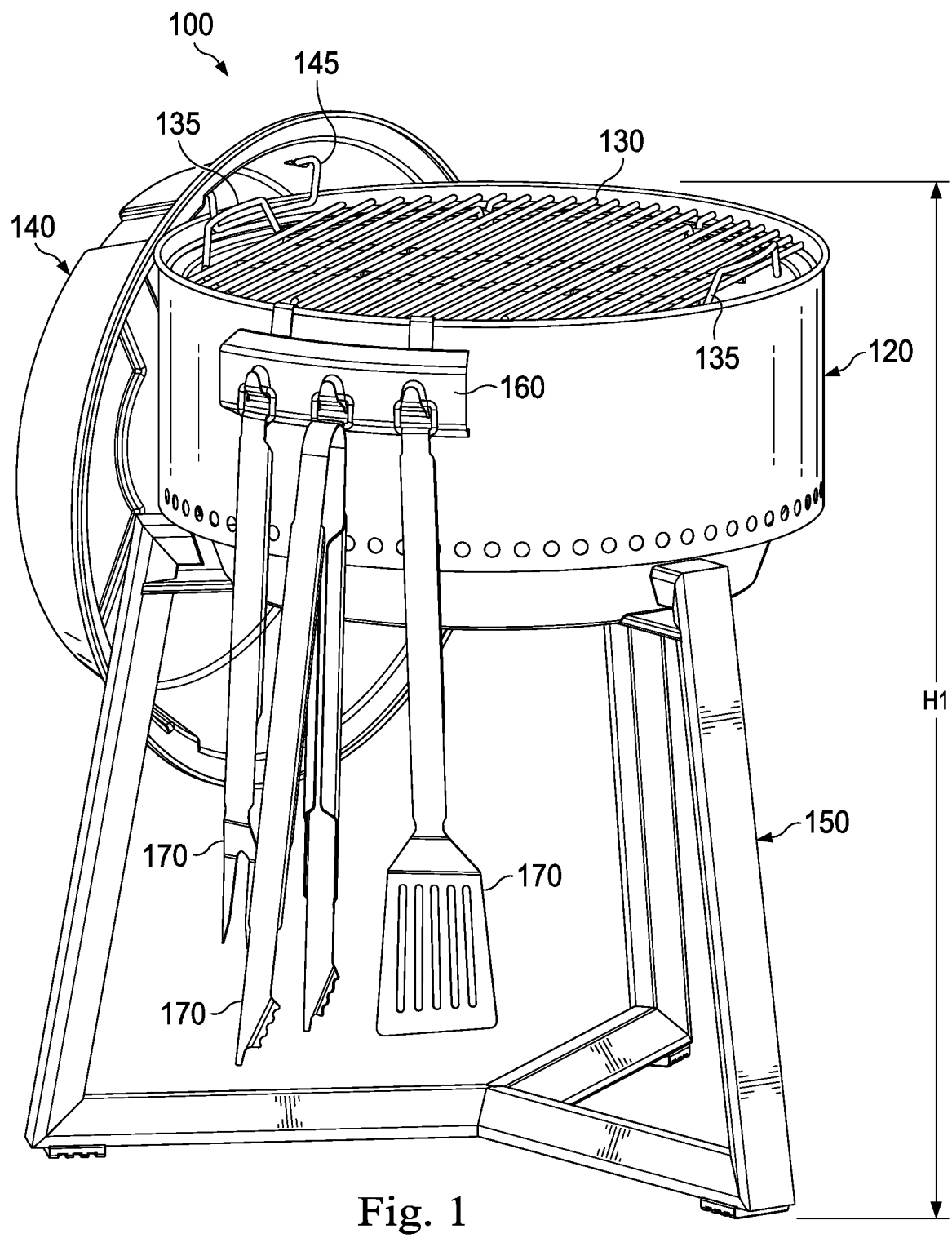
FIG. 1 is a perspective view of an example packable modular combustion grill, in accordance with at least one embodiment of the present disclosure.

Embodiments of the present disclosure and their advantages are described in the detailed description that follows. It should be appreciated that like reference numerals are used to identify like elements illustrated in one or more of the figures for purposes of illustrating but not limiting embodiments of the present disclosure.

DETAILED DESCRIPTION

For the purposes of promoting an understanding of the principles of the present disclosure, reference will now be made to the embodiments illustrated in the drawings, and specific language will be used to describe the same. It is nevertheless understood that no limitation to the scope of the disclosure is intended. Any alterations and further modifications to the described devices, systems, and methods, and any further application of the principles of the present disclosure are fully contemplated and included within the present disclosure as would normally occur to one skilled in the art to which the disclosure relates. In particular, it is fully contemplated that the features, components, and/or steps described with respect to one embodiment may be combined with the features, components, and/or steps described with respect to other embodiments of the present disclosure. For the sake of brevity, however, the numerous iterations of these combinations will not be described separately. These descriptions are provided for exemplary purposes only and should not be considered to limit the scope of the packable modular combustion grill. Certain features may be added, removed, or modified without departing from the spirit of the claimed subject matter.

In accordance with at least some embodiments of the present disclosure, a packable modular combustion grill addresses one or more shortcomings of existing grills. The packable modular combustion grill may include various combinations of a grill stove body, a grill stove lid, a grill stove stand, a grill stove utensil hanger, and grill stove fuel packs. The grill body may include a ventilated, doubled-walled body design to allow for a cooler outer surface of the grill body, and to increase heat retention within the grill body and to help even out the distribution of heat within the grill body. The grill body may also include a coal grate for supporting combustible fuel and allowing ash and other combustion remnants to fall through. The grill body may further include a grill grate to serve as a cooking surface for grillable food. The grill grate may be hinged to allow access to the fuel while the grill is in operation. The grill body may additionally include an ash pan for catching the remains of combusted fuel from the coal grate, and a base pan spaced from the ash pan by an air gap to allow for a cooler bottom surface of the grill body. The grill lid may include tapered sides to allow the lid to be inverted and fitted into the grill body. The grill lid may further include a flat top, a handle, a heat shield, a closeable vent, and a lid hanger configured to hang from the grill body. The utensil hanger may include brackets to hang the utensil hangar from the grill body, and utensil hooks to hang utensils from the utensil hanger. The grill stand may include three legs attached together at the top center and bottom center, forming a shelf to support the grill body. The fuel packs may include a combustible wrapper that is sized and shaped to cover a specified portion of the coal grate. The fuel packs may further include text and graphical instructions, a quantity of combustible fuel sized to facilitate particular cooking tasks, and one or more fire lighters capable of burning with an open flame for a specified period of time when ignited. The packable modular combustion grill may be storable, such that the lid can be inverted and stored inside the grill body, and the legs removed from the stand, to reduce the volume of the packable modular combustion grill for storage or shipping.

The present disclosure aids outdoor cooking operations by improving the usability of combustion-type grilling stoves, such as, for example, wood-fueled or charcoal-fueled grilling stoves. Implemented in stainless steel with a body design that maximizes air flow for even combustion and to cool outer surfaces, the packable modular combustion grills disclosed herein provide practical devices, methods, and systems for grilling food using radiant and/or convective heat, without measuring fuel quantities or adding combustion accelerants. This improved grilling process transforms an imprecise cooking procedure with poor repeatability into a precise, repeatable procedure. This unconventional approach improves the functioning of the grill stove by allowing even inexperienced users to obtain desired cooking results.

FIG. 1 is a perspective view of an example packable modular combustion grill 100, in accordance with at least one embodiment of the present disclosure. The packable modular combustion grill 100 includes a grill body 120 that includes a grill grate 130 with grill grate handles 135, a grill lid 140 with a grill lid hanger 145, a grill stand 150, and a utensil hanger 160 from which utensils 170 may be hung. The packable modular combustion grill 100 has an overall height H1, from the bottom of the grill stand 150 to the top of the grill body 120. In some examples, H1 is in a range of about 14 to 48 inches, depending on the height of the grill body 120 and the height of the grill stand 150. The grill stand 150 may come in any desired height, including heights that would result in H1 being about 14 inches to heights that would result in H1 being about 48 inches. In other examples, H1 is in a range of about 24 to 36 inches. In some embodiments, H1 is in a range of about 29 to 30 inches. Depending on the implementation, the height of the grill stand 150 and the grill body 120 may be selected to be tall enough to be accessible by a standing person, but short enough to be readily portable, and to be accessible by a person seated in a chair. However, other values both larger and smaller may be used instead or in addition, as shorter grills may be more portable and taller grills may be easier to use while standing.

In the example shown in FIG. 1, the grill body 120 of packable modular combustion grill 100 is having a generally cylindrical outer surface shape. However, it should be understood that at least some portions of the packable modular combustion grill 100, including the grill body 120, may be otherwise shaped. For example, the grill body 120 may be shaped as a square, rectangle, triangle, hexagon, octagon, or other shape.

Figure 2:
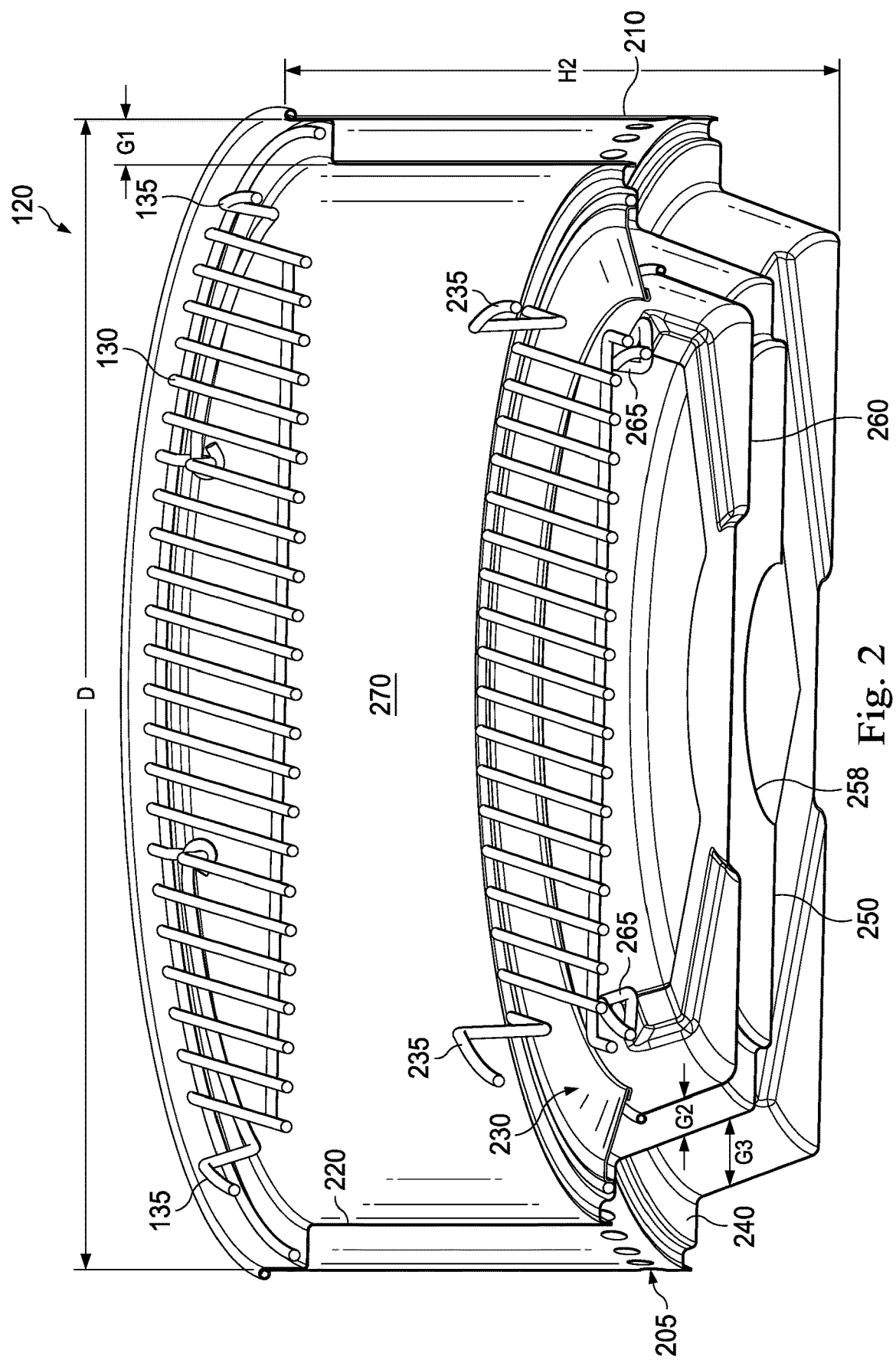
FIG. 2 is a perspective cross-sectional view of a grill body of an example packable modular combustion grill, in accordance with at least one embodiment of the present disclosure.

FIG. 2 is a perspective cross-sectional view of the grill body 120 in accordance with at least one embodiment of the present disclosure. In this example implementation, the grill body 120 includes a kettle 205 a coal grate 230 with coal grate handles 235, grill grate 130 with grill grate handles 135, and ash pan 260 with ash pan handles 265.

The kettle 205 includes an outer wall 210, an inner wall 220, an outer wall base pan 240, and a coal grate nest pan 250 having a central airflow opening 258. In the example shown in FIG. 2, the outer wall 210 and inner wall 220 include smooth, vertical, cylindrical surfaces, although in some embodiments these surfaces may be more complex (e.g., stepped, grooved, angled, or tapered). The outer wall base pan 240 includes a relatively flat bottom and conically tapering sides. Likewise, the coal grate nest pan 250 also includes a relatively flat bottom and conically tapering sides. As shown in FIG. 2, the outer wall base pan 240 intersects with and is connected to a bottom region of the outer wall 210. In a similar manner, the coal grate nest pan 250 intersects with and is connected to a bottom region of the inner wall 220. As can be seen in FIG. 2, the inner wall 220 is shorter than the outer wall 210, and therefore, edges of the outer wall base pan 240 are disposed at a different elevation than the edges of the coal grate nest pan 250. In some implementations however, the outer wall base pan 240 may be formed without sides, and edges of the relatively flat bottom of the outer wall base pan 240 may directly abut against or intersect the outer wall 210. The inner wall 220, coal grate 230, and grill grate 130 generally define an interior chamber 270 that may be described as a chimney, flue, or heatable air space. In some instances, the interior chamber may also extend to the nest pan 250.

In some embodiments, the outer wall 210 and inner wall 220 are separated by a gap G1, such that the grill body 120 is a double-walled structure that facilitates air flow, increases heat retention (with trapped air between the inner and outer wall serving as insulation), maximized the even distribution of heat, and helps isolate the outer wall 210 from the heat generated inside the grill body 120. In some embodiments, the ash pan 260 includes a solid bottom and a conically tapering side. As shown in FIG. 2, a width (a diameter in circular embodiments) of the bottom of the ash pan 260 is smaller than a width of the coal grate nest pan 250, which is smaller than a width of the outer wall base pan 240. As such, the sides and/or bottom of the ash pan 260 are separated from the sides and/or bottom of the coal grate nest pan 250 by a gap G2, and the sides and/or bottom of coal grate nest pan 250 are separated from the sides and/or bottom of the outer wall base pan 240 by a gap G3. In some examples, each of gap G1, gap G2, and gap G3 is in a range of about 0.5 to 2.5 inches. In some implementations, the gap G1 is about 1.25", the gap G2 is about 0.75", and the gap G3 is equal to 1.25", although other values both larger and smaller may be used instead or in addition. It should further be understood that these may be approximate and/or average values that describe the separation between complex pan shapes with non-constant profiles due to embossing, rollover edges, non-parallel sides, and other features.

The grill body 120 has an overall diameter D and a height H2. In some examples, the diameter D is in a range of about 9 to 30 inches and the height H2 is in a range of about 6 to 15 inches. In other examples, the diameter D is in a range of about 15 to 20 inches and the height H2 is in a range of about 10 to 12 inches. In specific examples, the diameter D is about 18", 22, or 26, and H2 is about 11", although other values both larger and smaller may be used instead or in addition.

Figure 3:
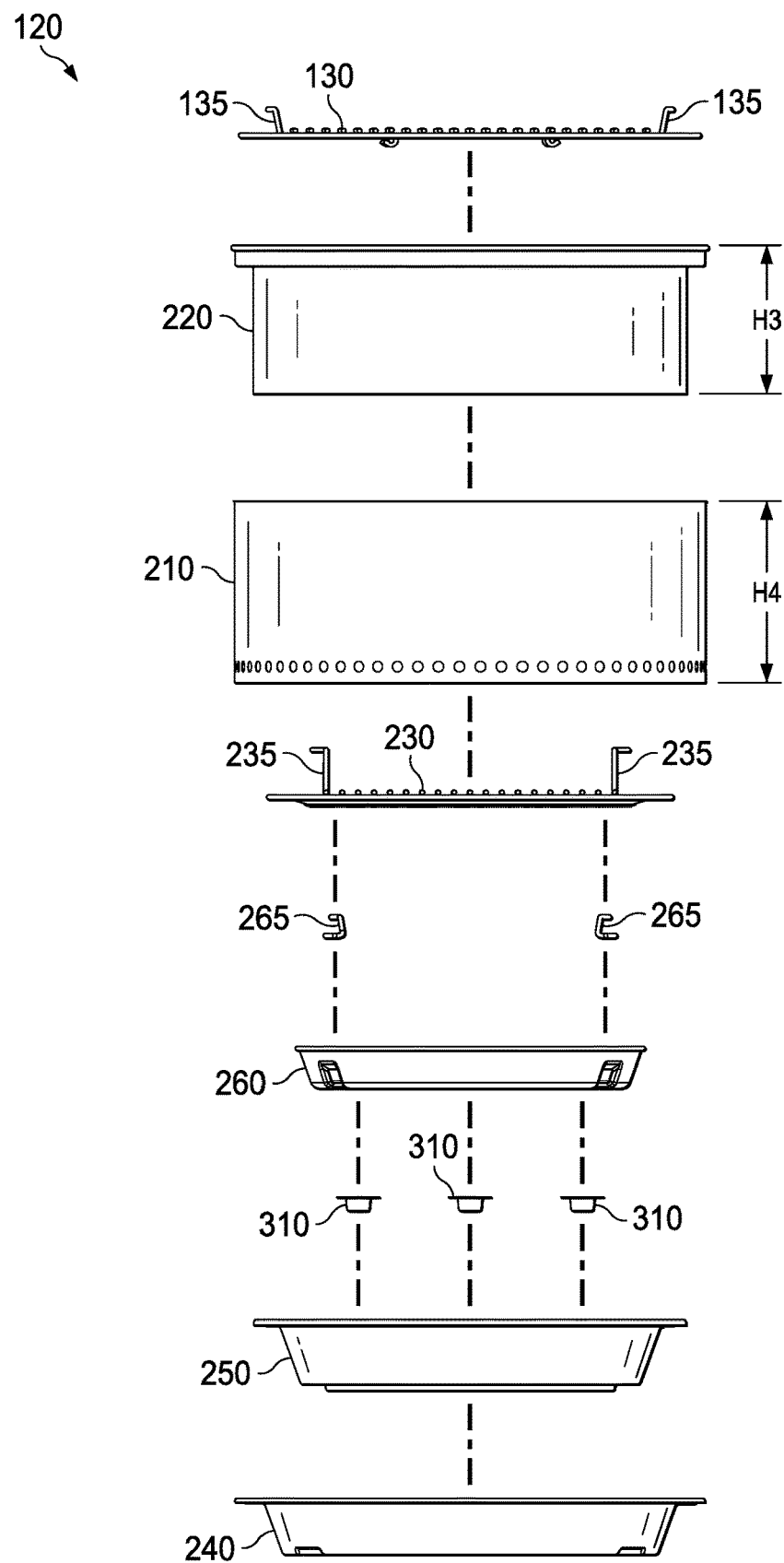
FIG. 3 is an exploded view of a grill body of an example packable modular combustion grill, in accordance with at least one embodiment of the present disclosure.

FIG. 3 is an exploded view of the grill body 120 of the example packable modular combustion grill 100, in accordance with at least one embodiment of the present disclosure. Visible are the grill grate 130 with grill grate handles 135, inner wall 220, outer wall 210, coal grate 230 with coal grate handles 235, ash pan 260 with ash pan handles 265, coal grate nest pan 250, and outer wall base pan 240. In some embodiments, the outer wall 210 rests in the top of the outer wall base pan 240, while the inner wall 220 includes a flange that extends radially outward toward and is secured to the top of the outer wall 210. Also visible are standoffs 310, which maintain a gap between the bottom of the ash pan 260 and the bottom of the coal grate nest pan 250. In an example, three standoffs 310 are coupled to the ash pan 260 by welds, although other numbers of standoffs and other means of coupling may be used instead or in addition.

In some embodiments, to allow for air flow in the kettle 205, the height H3 of the inner wall 220 may be less than the height H4 of outer wall 210. In an example, the difference in heights may be in a range of about 0.5 to 4 inches, although larger and smaller differences are also contemplated. In some examples, the height H3 is about 6" and the height H4 is about 8.5", creating a height difference of about 2.5 inches, although other values both larger and smaller may be used instead or in addition.

In an example, some, most, or all of the components of the grill body 120 are made of stainless steel, which exhibits high strength, low thermal conductivity, high corrosion resistance, and relatively easy cleaning as compared with other heat-resistant materials. However, other materials may be used instead or in addition to stainless steel, including but not limited to ceramics, composites, and other metals.

Figure 4:
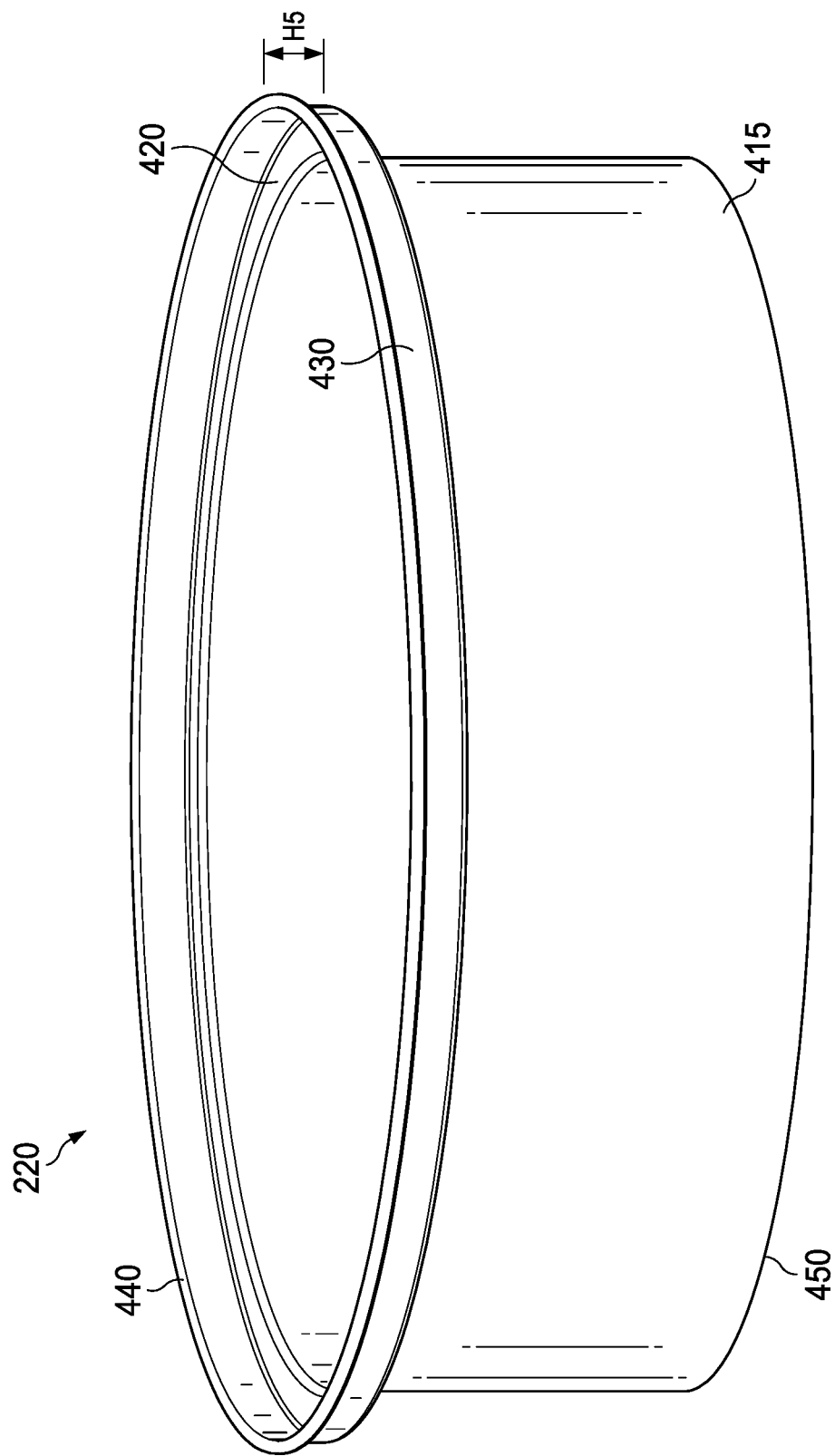
FIG. 4 is a perspective view of an inner wall member of an example packable modular combustion grill, in accordance with at least one embodiment of the present disclosure.

FIG. 4 is a perspective view of an inner wall 220 of an example packable modular combustion grill 100, in accordance with at least one embodiment of the present disclosure. The inner wall member 220 includes a chimney wall 415 defining a central axis, top collar 420, top collar rim 430, top lip 440, and bottom lip 450. In some embodiments, the grill grate 130 (not pictured) rests on the top collar 420 and nests within the top collar rim 430, as shown for example in FIG. 2. In some embodiments, the chimney wall 415 nests within the outer wall 210 (FIG. 2), and the top collar 420 rests on top of, or is welded or otherwise attached to, the outer wall 210 (FIG. 2), while the bottom lip 450 hangs free in space. In an example, the combined height H5 of the top collar rim 430 and lip 440 is in a range of about 0.5 to 4 inches, and in one example embodiment, about 1 inch, although other values both larger and smaller may be used instead or in addition.

Figure 5:
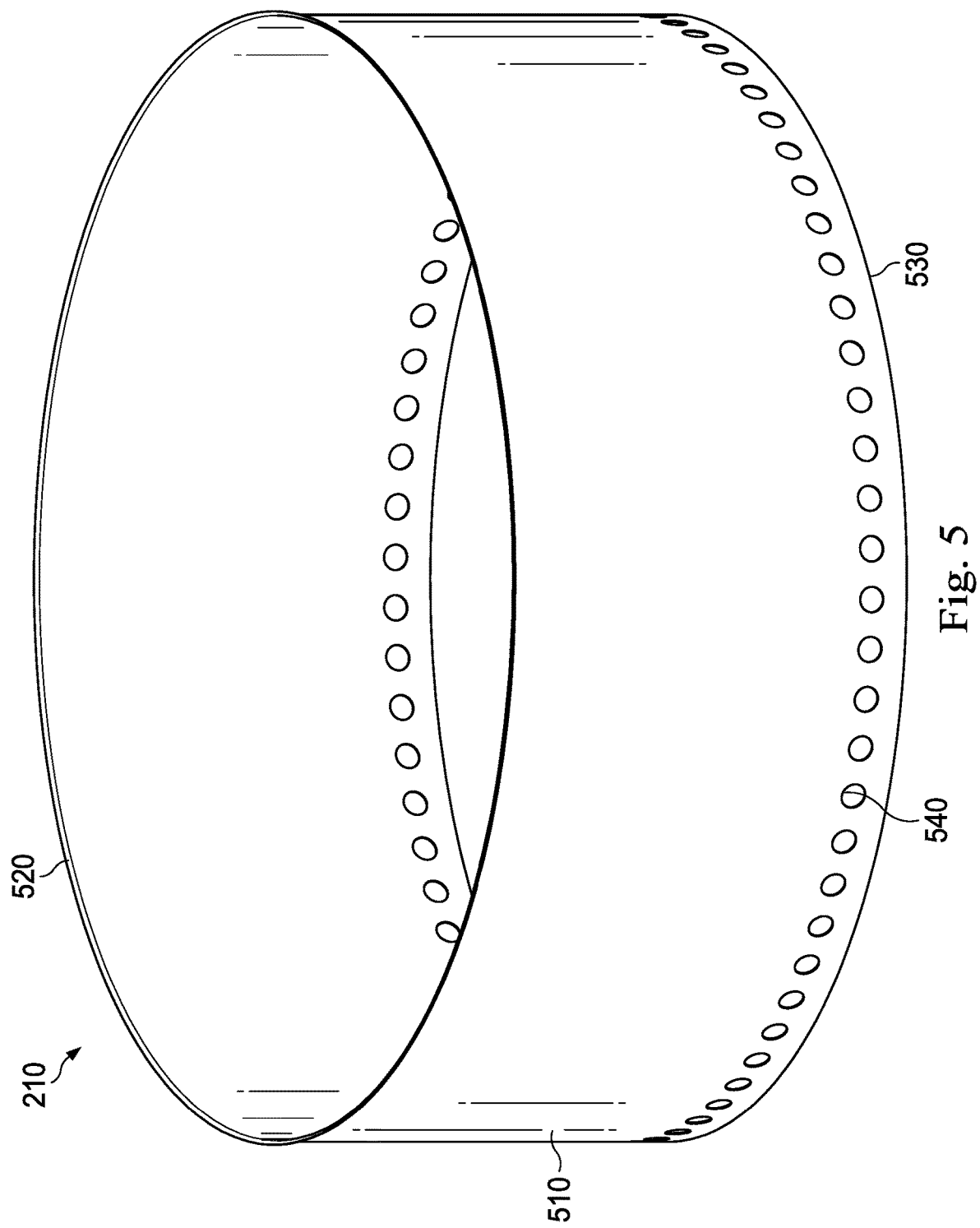
FIG. 5 is a perspective view of an outer wall member of an example packable modular combustion grill, in accordance with at least one embodiment of the present disclosure.

FIG. 5 is a perspective view of an outer wall 210 of an example packable modular combustion grill 100, in accordance with at least one embodiment of the present disclosure. The outer wall 210 includes a sleeve 510 defining a central axis (that may be co-axial with the central axis of the inner wall when assembled), top lip 520, bottom lip 530, and a plurality of ventilation apertures 540. In the example shown, the ventilation apertures 540 occur in a single row that is positioned lower than the bottom of the inner wall 220 (as shown for example in FIG. 2) and may be in a range of about 0.2 to 1 inch in diameter. In some examples, they ventilation apertures are about 0.5" in diameter, and may be spaced about 0.5" between edge to edge. Other types of ventilation apertures, including other shaped apertures, such as slots, windows, or other openings with other spacing are also contemplated. In some embodiments, the top collar 420 of the inner wall 220 (FIG. 4) rests on top of, or is welded or otherwise attached to, the top lip 520, and the bottom lip 520 rests in, or is welded or otherwise attached to, the outer wall base pan 240 (FIG. 2). In some embodiments, the outer wall 220 is made of rolled stainless steel. Ends may be joined via a welded seam that may be polished or blended to minimize its visibility.

Figure 6:
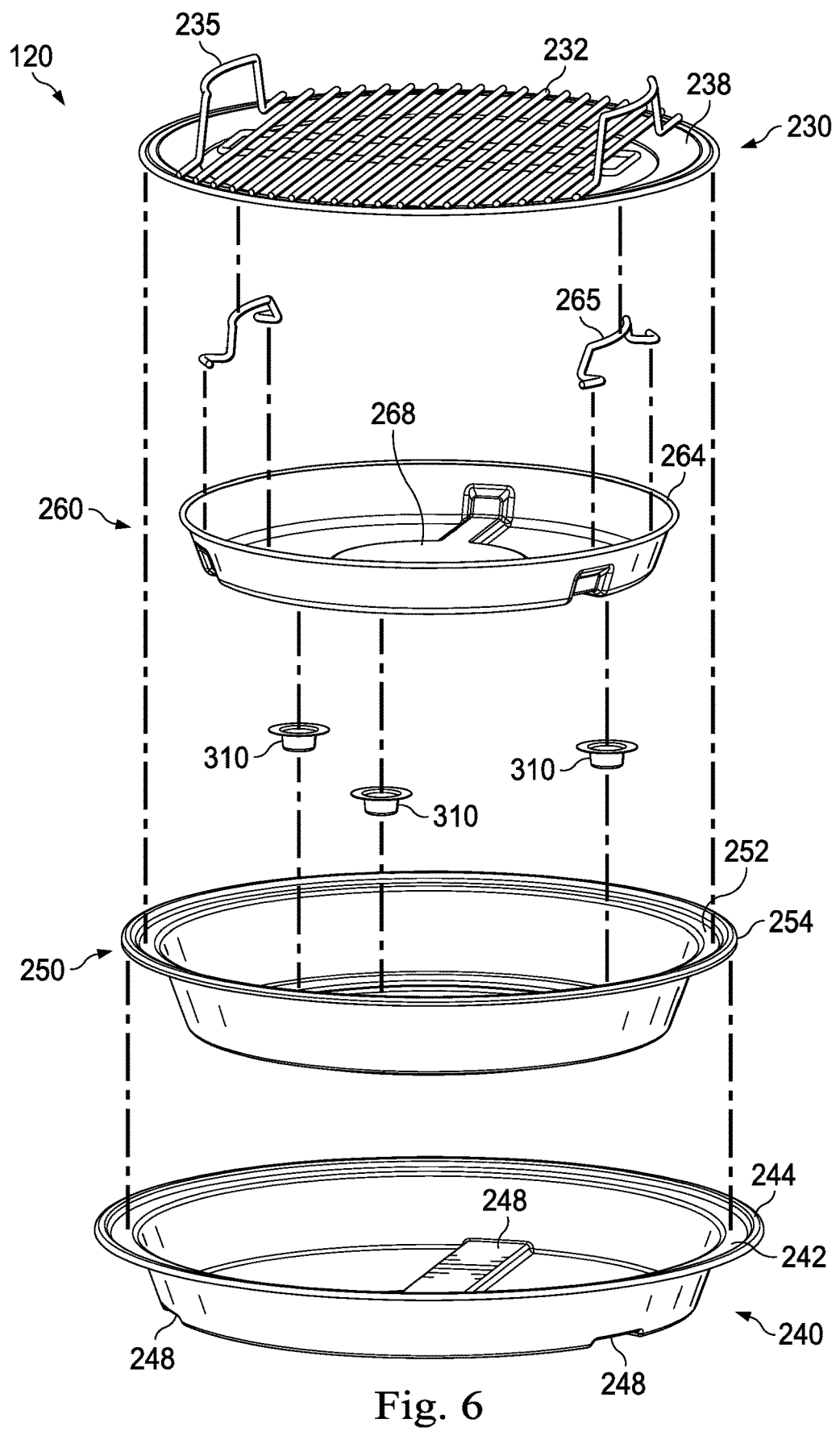
FIG. 6 is an exploded view of at least a portion of a grill body of an example packable modular combustion grill, in accordance with at least one embodiment of the present disclosure.

FIG. 6 is an exploded view of at least a portion of a grill body 120 of an example packable modular combustion grill 100 in accordance with at least one embodiment of the present disclosure. Visible is the coal grate 230, which includes a grating 232, two coal grate handles 235 for grasping by a user, and a funnel edge 238 to direct falling ash, combustion debris, burning and dripping foods or oils radially inward toward the central axis and downward. In an example, the grating 232 is tack welded to the funnel edge 238. Also visible is the ash pan 260, which includes two ash pan handles 265 and a plurality of standoffs 310. The ash pan handles and/or the plurality of standoffs 310 may be welded or otherwise attached to the ash pan 260. The ash pan 260 may also include a rollover lip 264 and/or embossed features 268, which may provide strength and stiffness to the ash pan 260 to reduce the chance of heat-related warping. In some embodiments, the ash pan 260 nests removably inside of the grate nest pan 250, and the coal grate 230 rests removably in a grate nest pan nesting collar 252 and is partially retained by a raised lip 254. In some embodiments, both the ash pan 260 and the coal grate 230 may be readily removed from the grate nest pan 250 for cleaning. In some embodiments, the raised lip 254 of the grate nest pan 250 is welded or otherwise attached to the bottom lip 450 of the inner wall 220 (FIG. 2).

The grate nest pan 250 nests inside the outer wall base pan 240 as shown in FIG. 2. However, in some embodiments the grate nest pan 250 does not contact the outer wall base pan 240 at any point. In these embodiments, the bottom lip 530 of the outer wall 210 (FIG. 2) rests on or is welded or otherwise attached to a nesting collar 242 and/or raised lip 244 of the outer wall base pan 240. The inner wall 220 hangs from the outer wall 210, and the coal grate nest pan 250 hangs from (e.g., is welded to) the bottom of the inner wall 220. Thus, in the double-walled design of the packable modular combustion grill 100, the outer wall base pan 240 forms a bottom surface for the outer wall 210, while the coal grate nest pan 250 forms a bottom surface of the inner wall 220.

In some embodiments, the outer wall base pan 240 also includes embossed features 248 sized and shaped to receive shelf portions of the grill stand 150, as described below with reference to FIG. 15, such that the grill body 120 is able to nest non-rotatably on top of the grill stand 150, as shown for example in FIG. 1. These embossed features 248, along with the raised lip 244, may also provide added strength and stiffness to the outer wall base pan, to help limit the occurrence of heat-related warping.

Figure 7:
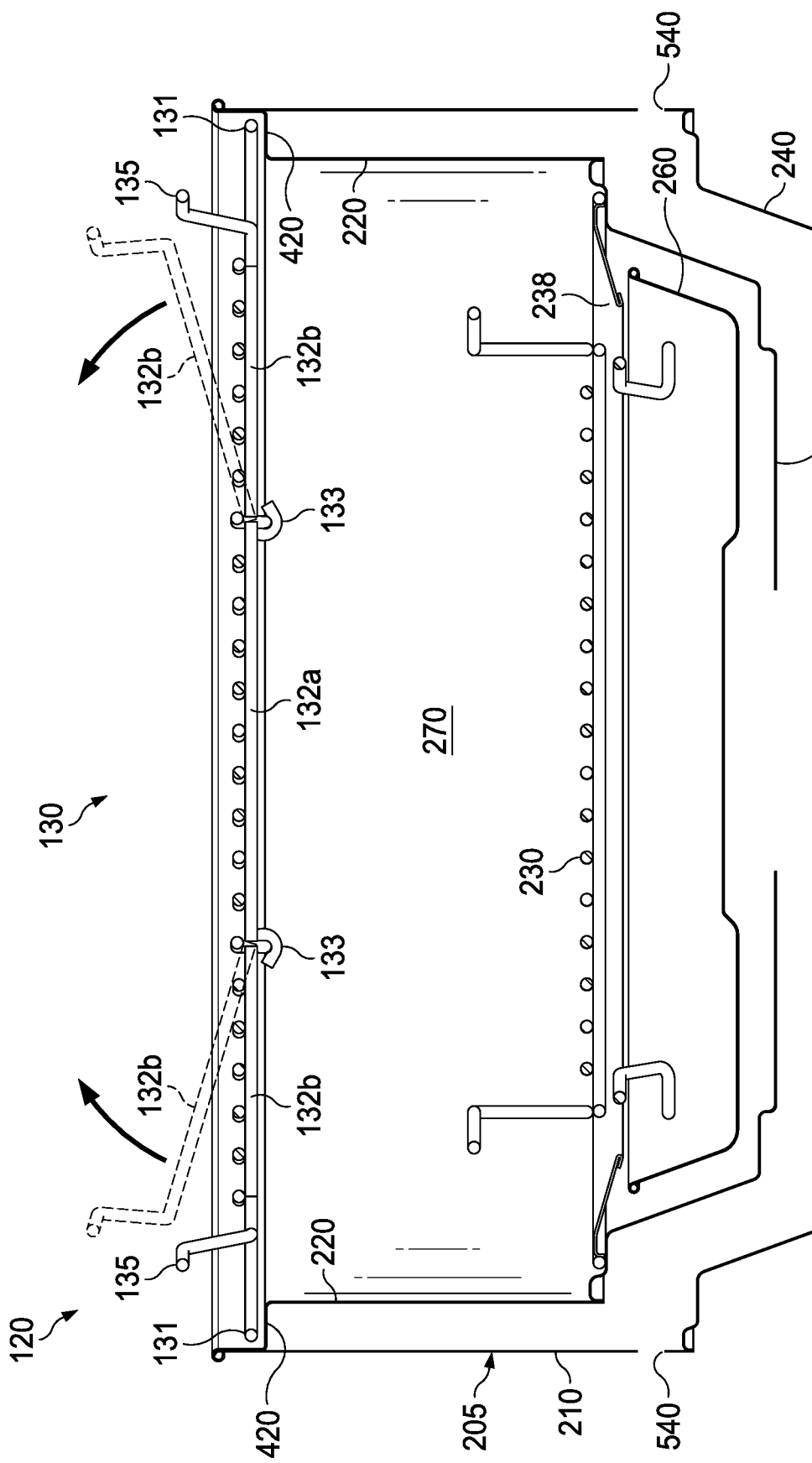
FIG. 7 is a cross-sectional view of a grill body of an example packable modular combustion grill, in accordance with at least one embodiment of the present disclosure.

FIG. 7 is a cross-sectional view of a grill body 120 of an example packable modular combustion grill 100, in accordance with at least one embodiment of the present disclosure. Visible is the grill grate 130, with an outer support ring 131 resting removably on the top collar 420 of the inner wall 220. The grill grate 130 may also include a center section 132a that is stationary or fixedly attached to the outer support ring 131. Attached to the center section 132a are hinges 133, which permit two hinged sections 132b to be individually pivotably raised when an upward force is applied to the corresponding handle 135. In an example, raising a hinged section 132b may permit a utensil or other tool to reach into the interior chamber 270 (e.g., to rearrange coals on the coal grate), without removing the grill grate 130 from the grill body 120. Removing a grill grate from a grill body while the grill is in use may entail a risk of contamination, injury, or fire, so the ability to access the interior chamber 270 without removing the grill grate 130 represents a substantial improvement over previously existing grill technology.

Figure 8:
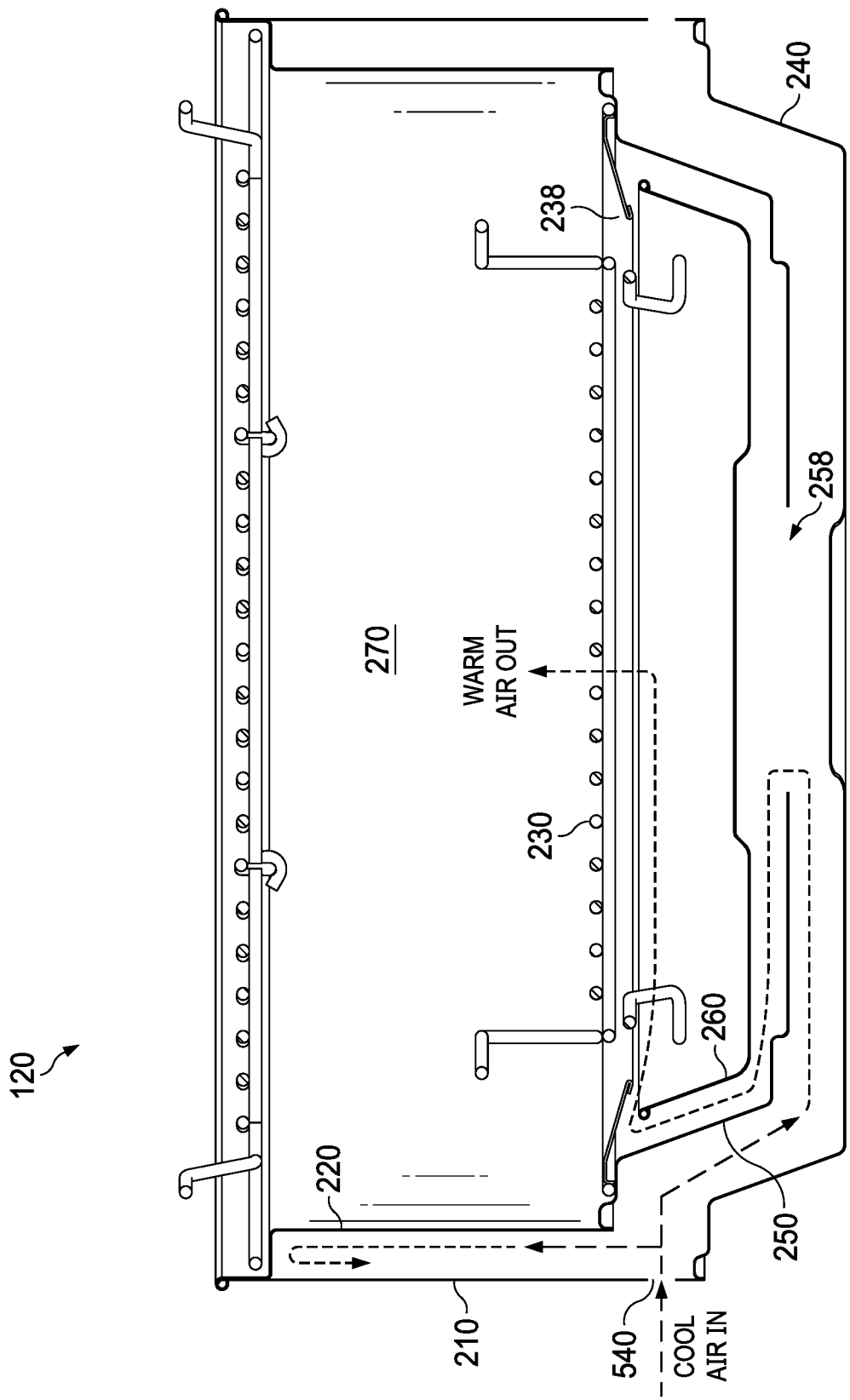
FIG. 8 is a diagrammatic, cross-sectional view of the air flow within a grill body of an example packable modular combustion grill, in accordance with at least one embodiment of the present disclosure.

FIG. 8 is a diagrammatic, cross-sectional view of the grill body 120 showing air flow in accordance with at least one embodiment of the present disclosure. Cool air enters through the ventilation apertures 540, passes under the coal grate nest pan 250, upward through the airflow opening 258 in the center of the coal grate nest pan 250, around the ash pan 260. Thus, the ventilation apertures 540, are in fluid communication with the airflow opening 258 in the center of the coal grate nest pan 250 and in fluid communication with the central chamber, and ultimately, the opening of the grill body. The air is heated as it passes underneath the coal grate 230, and then rises upward through the coal grate 230 into the interior chamber 270. Cool air also circulates in the space between the outer wall 210 and inner wall 220, which may permit the outer wall 210 to remain cooler than the inner wall 220 and thus provide some protection against burn injury due to accidental contact with the outer wall 210. It is also noted that pathways for air to travel through the packable modular combustion grill 100 may also provide drainage pathways to remove water, for example when the packable modular combustion grill 100 is cleaned, or when rainwater or snowmelt enters the packable modular combustion grill 100. In the embodiment shown, the funnel edge 238 of the coal grate 230 has an inner opening having a width smaller than or equal to a width of the opening of the ash pan 260. Accordingly, as grilling fuel burns and creates ash, the ash may be directed by the funnel edge 238 into the ash pan 260. Furthermore, any juices, residue, and food that may pass through the grill grate 130 may drip into the ash pan 260.

Figure 9:
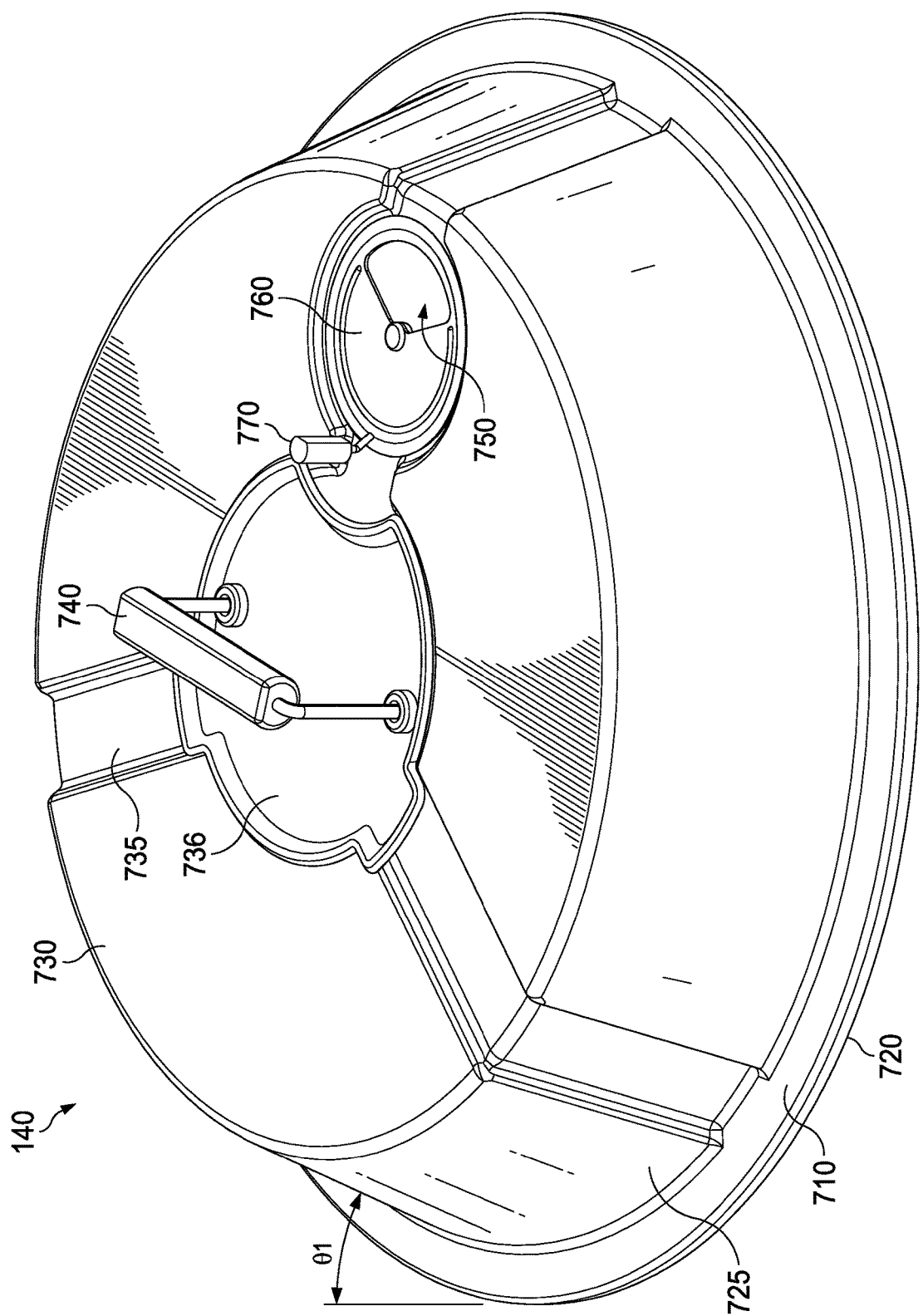
FIG. 9 is a perspective view of a grill lid of an example packable modular combustion grill, in accordance with at least one embodiment of the present disclosure.

FIG. 9 is a perspective view of the grill lid 140 in accordance with at least one embodiment of the present disclosure. The grill lid 140 may include a collar 710, rolled lip 720, tapered portion 725 forming a taper angle $\theta 1$ with the vertical, and top portion 730. In an example, these portions are made of powder coated stainless steel, although other materials or finishes may be used instead or in addition. The taper angle $\theta 1$ may facilitate storing of the grill lid 140 within the grill body 120 in an upside-down orientation. In an example, the taper angle $\theta 1$ is approximately 20 degrees, although other values both larger and smaller may be used instead or in addition. In some examples, the taper angle is in a range between about 5 degrees and about 30 degrees. In other examples, the taper angle range is between about 2 degrees and about 45 degrees).

In some embodiments, the top portion 730 is substantially flat, but includes embossed areas 735 that may provide structural strength and stiffness to help resist heat-related warping. A central embossed area 735 includes a heat shield 736. The top portion 730 also includes a vent opening 750, which may for example be punched, stamped, or milled, and a rotatable vent cover 760 with a thermally insulating vent cover handle 770. In an example, the heat shield and vent cover may be made of stamped, uncoated stainless steel, and the although other materials or finishes may be used instead or in addition. The grill lid 140 also includes a thermally insulating grill lid handle 740, with may be attached to the top portion 730 by welds, fasteners, or other means.

Figure 10:
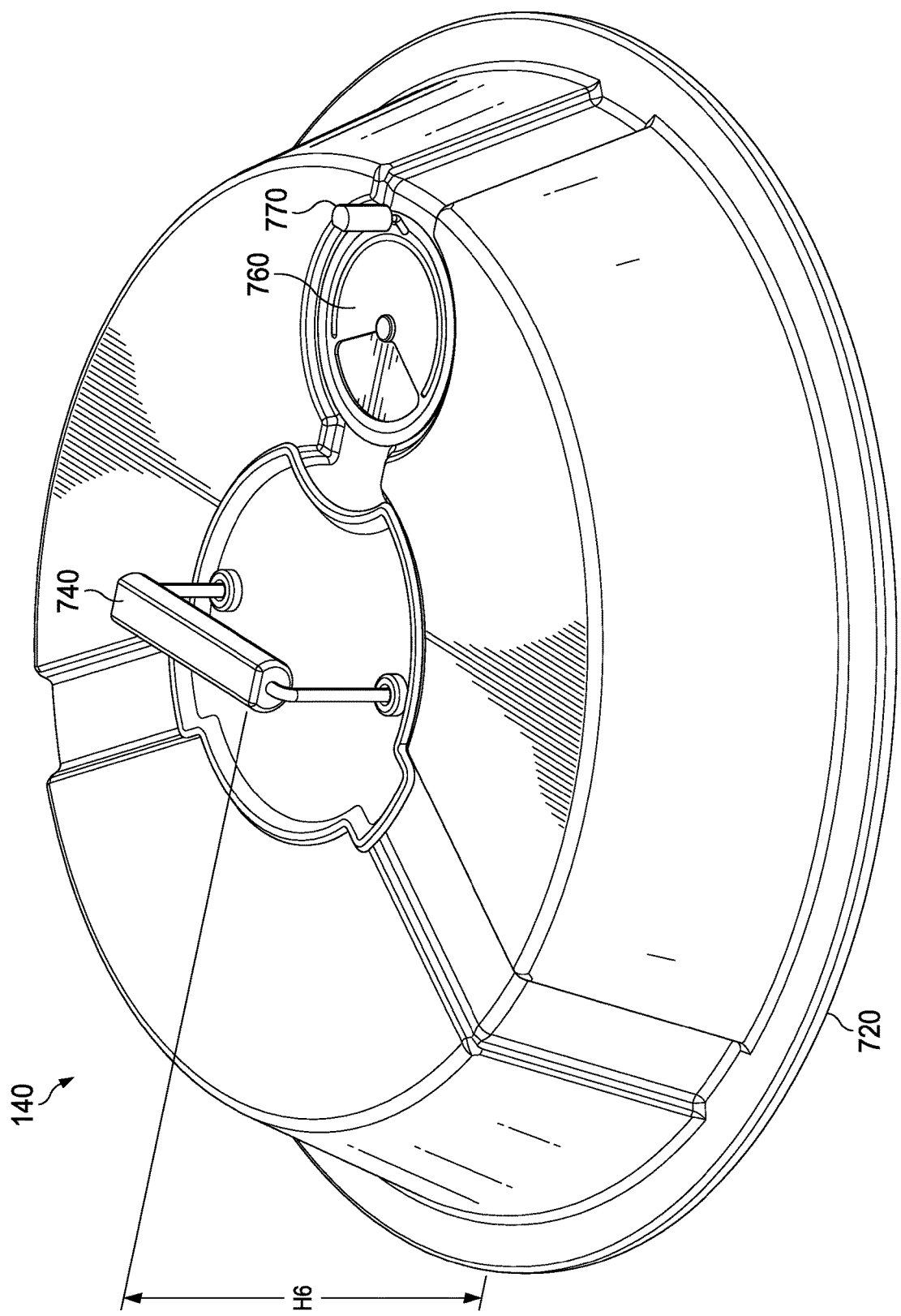
FIG. 10 is a perspective view of a grill lid of an example packable modular combustion grill, in accordance with at least one embodiment of the present disclosure.

FIG. 10 is a perspective view of a grill lid 140 with the vent cover 760 rotated (e.g., with handle 770) to cover the vent 750. In an example, the height H6, from the bottom of the rolled lip 720 to the top of the handle 740, is within a range of about 4 to 16 inches, and in some implementations, is about 8 to 9 inches, although other values both larger and smaller may be used instead or in addition.

Figure 11:
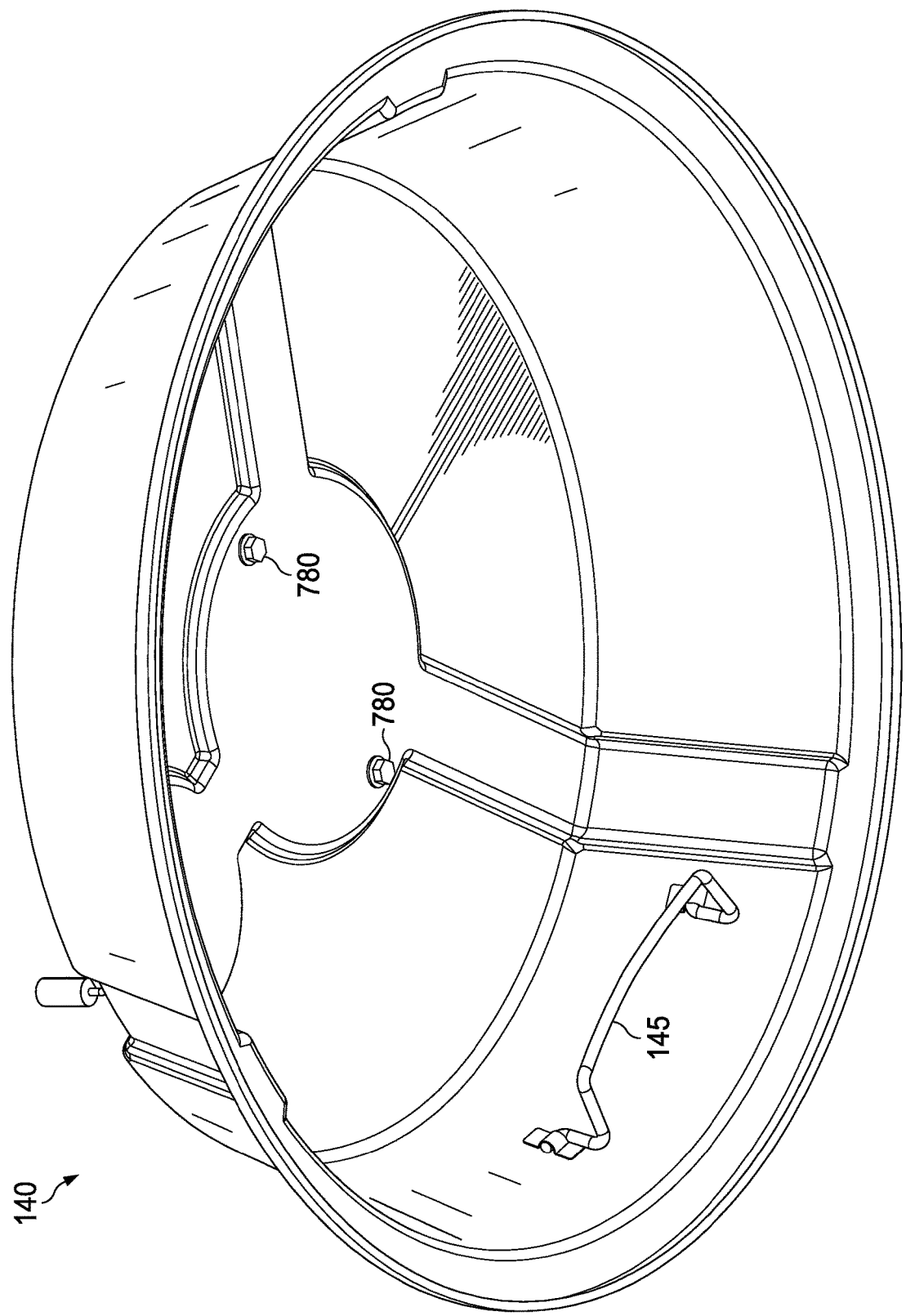
FIG. 11 is a perspective view of a grill lid of an example packable modular combustion grill, in accordance with at least one embodiment of the present disclosure.

FIG. 11 is a perspective view of a grill lid 140 of an example packable modular combustion grill 110, in accordance with at least one embodiment of the present disclosure. In this example, the grill lid 140 includes a grill lid hanger 145 that is sized, shaped, and positioned such that the lid 140 may be hung from the edge of the grill body 120 as shown for example in FIG. 1. In this example, two fasteners 780 are used to retain the handle 740 (FIG. 10) and heat shield 736 (FIG. 10) fixedly in place on the grill lid 140, although other means of attachment (e.g., welds) may be used instead or in addition.

Figure 12:
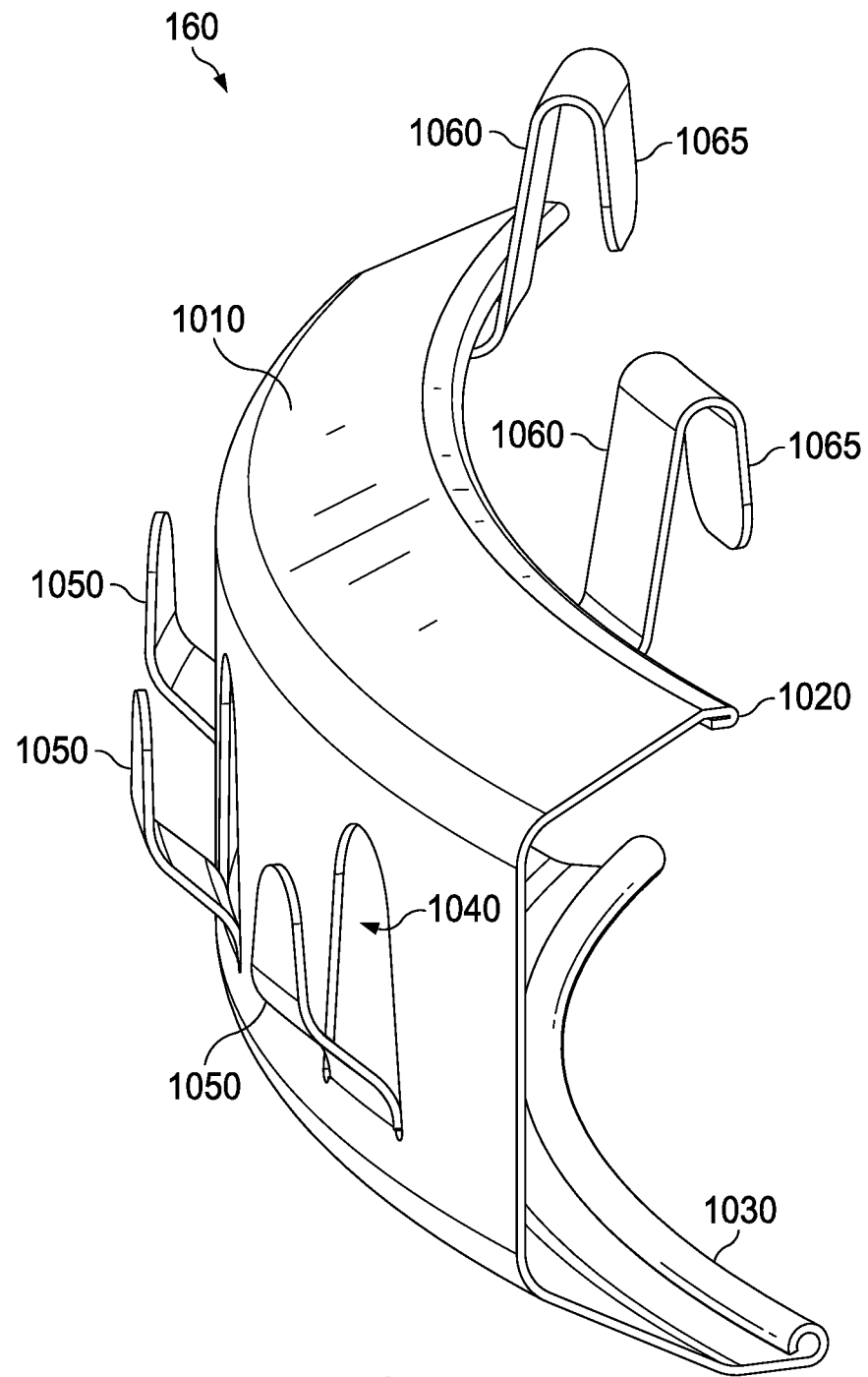
FIG. 12 is a perspective view of a utensil hanger of an example packable modular combustion grill, in accordance with at least one embodiment of the present disclosure.

FIG. 12 is a perspective view of a utensil hanger 160 of an example packable modular combustion grill 100, in accordance with at least one embodiment of the present disclosure. The utensil hanger 160 includes a main body 1010, upper lip 1020, and lower lip 1030, each of which may be sized and shaped such that the utensil hanger 160 can sit flush against the surface (e.g., a cylindrical surface) of the grill body 120. The utensil hanger 160 also includes a plurality of openings 1040 and tabs or hooks 1050 that may, for example, be punched or stamped. The tabs or hooks 1050 are configured such that utensils 170 may be hung from them, as shown for example in FIG. 1. In an example, the main body 1010, openings 1040, and tabs or hooks 1050 are formed from a single stamped piece of stainless steel, which is rolled over at the edges to form the lips 1020 and 1030. The utensil hanger 160 further includes brackets 1060, which include hooks 1065 configured to permit the utensil hanger 160 to hang from the top of the grill body 120, as shown for example in FIG. 1. In an example, the utensil hanger 160 and brackets 1060 are made of uncoated stainless steel, although other materials may be used instead or in addition. Although two brackets are shown, a different number of brackets may be used, including but not limited to one or three brackets.

Figure 13:
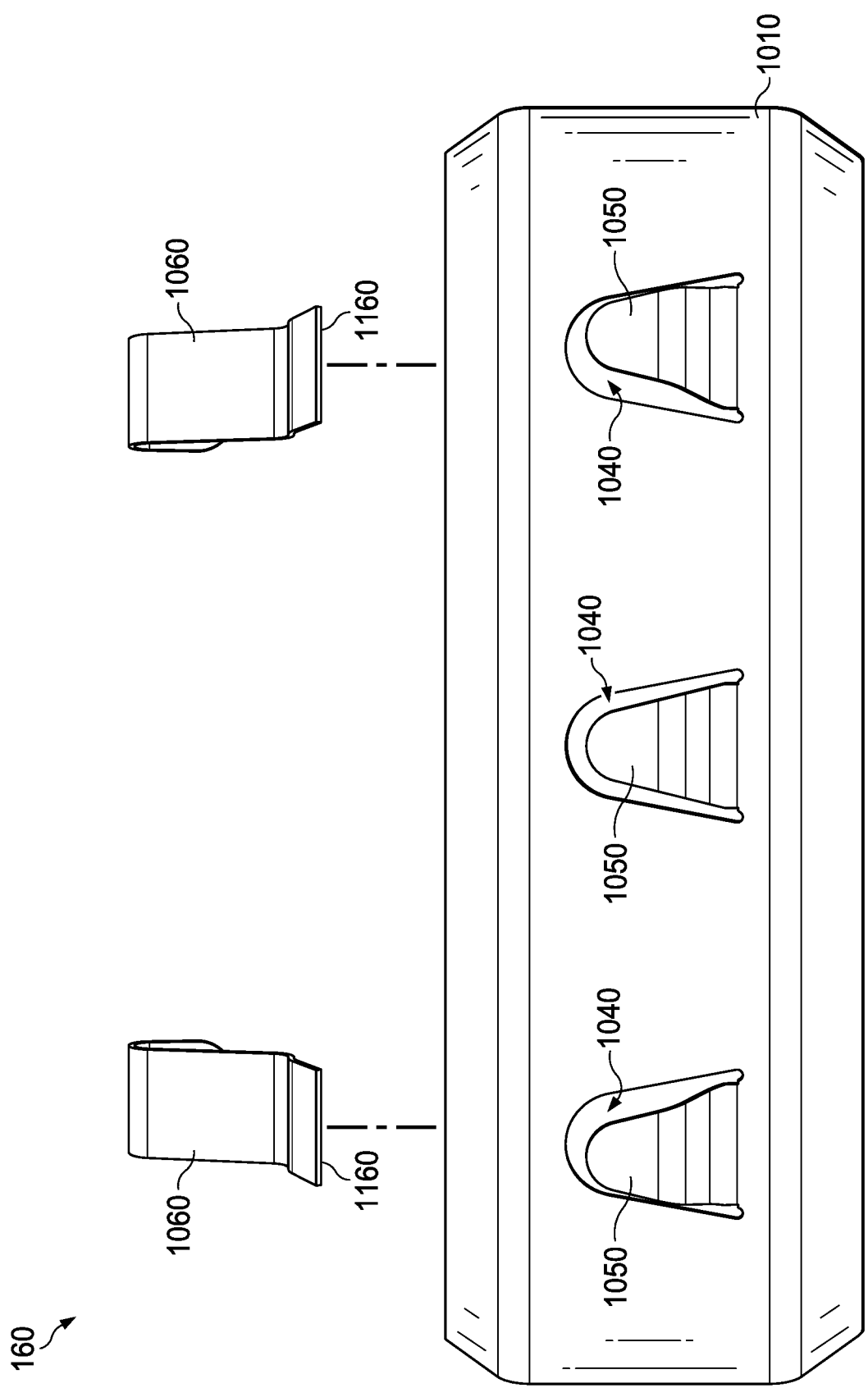
FIG. 13 is a perspective, exploded view of a utensil hanger of an example packable modular combustion grill, in accordance with at least one embodiment of the present disclosure.

FIG. 13 is a perspective, exploded view of a utensil hanger 160 of an example packable modular combustion grill 100, in accordance with at least one embodiment of the present disclosure. Visible are the main body 1010, openings 1040, tabs or hooks 1050, and brackets 1060. In an example, the brackets each include a groove 1160 for accepting the tool hanger upper lip 1020. In an example, the brackets are welded or otherwise attached to the main body 1010.

Figure 14:
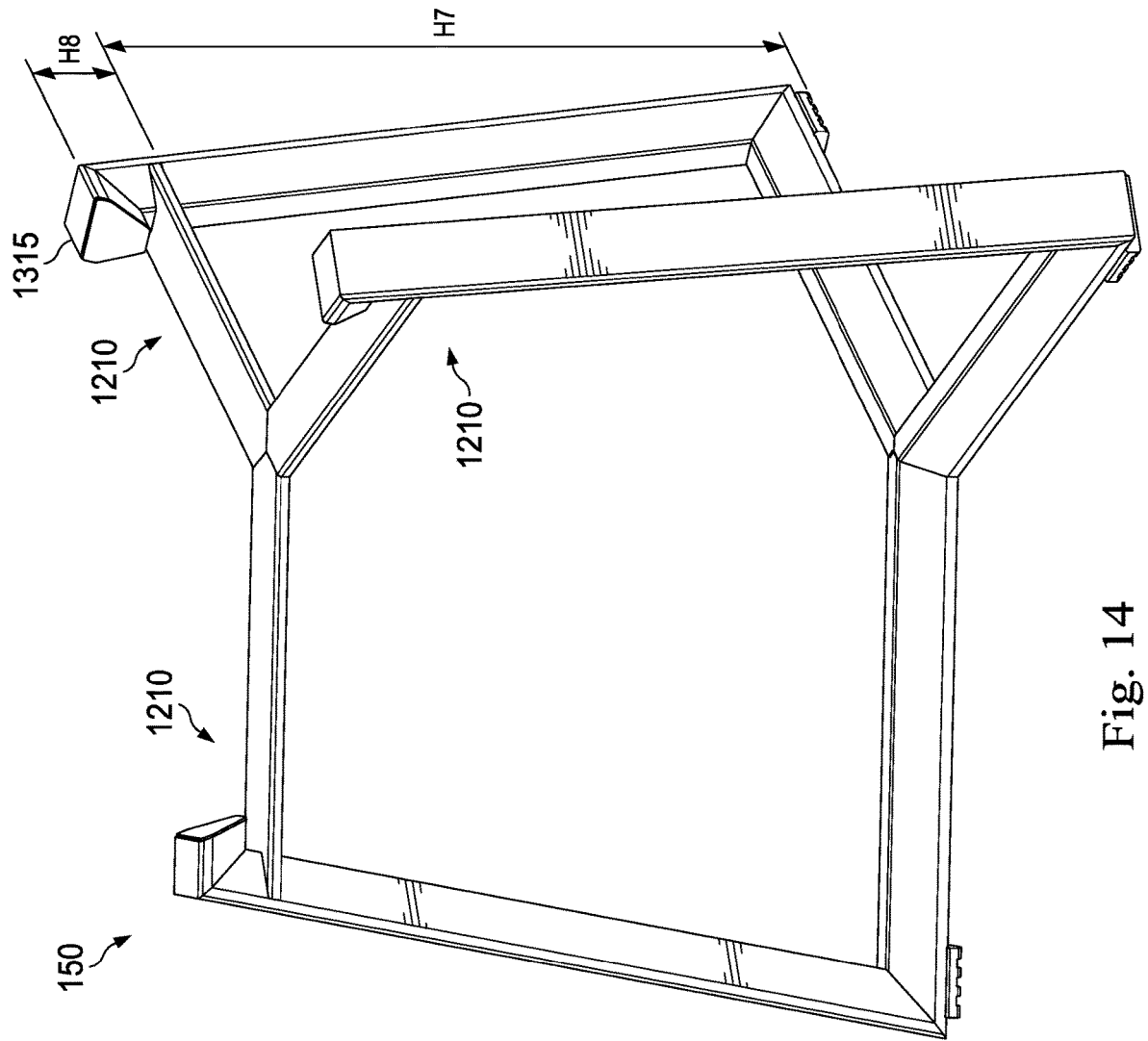
FIG. 14 is a perspective view of a grill stand of an example packable modular combustion grill, in accordance with at least one embodiment of the present disclosure.

FIG. 14 is a perspective view of a grill stand 150 of an example packable modular combustion grill 100, in accordance with at least one embodiment of the present disclosure. The grill stand 150 includes a plurality of legs 1210 of height H7, each topped by a bumper 1315 of height H8. In an example, the height H7 of the legs 1210 is about 11-12" or 19-20", and H2 is about 2", although other values both larger and smaller may be used instead or in addition. In some cases, a used may have the option of switching between a shorter grill stand 150 and a taller grill stand 150, for a different cooking experience. In the example shown in FIG. 14, the grill stand 150 includes three legs 1210. Other numbers of legs may be provided, including but not limited to four, five, or six legs. More than three legs 1210 may tend to increase the weight, cost, assembly time, and complexity of the grill stand 150. In an example, the legs and bumpers are made of powder coated stainless steel, although other materials or finishes may be used instead or in addition.

Figure 15:
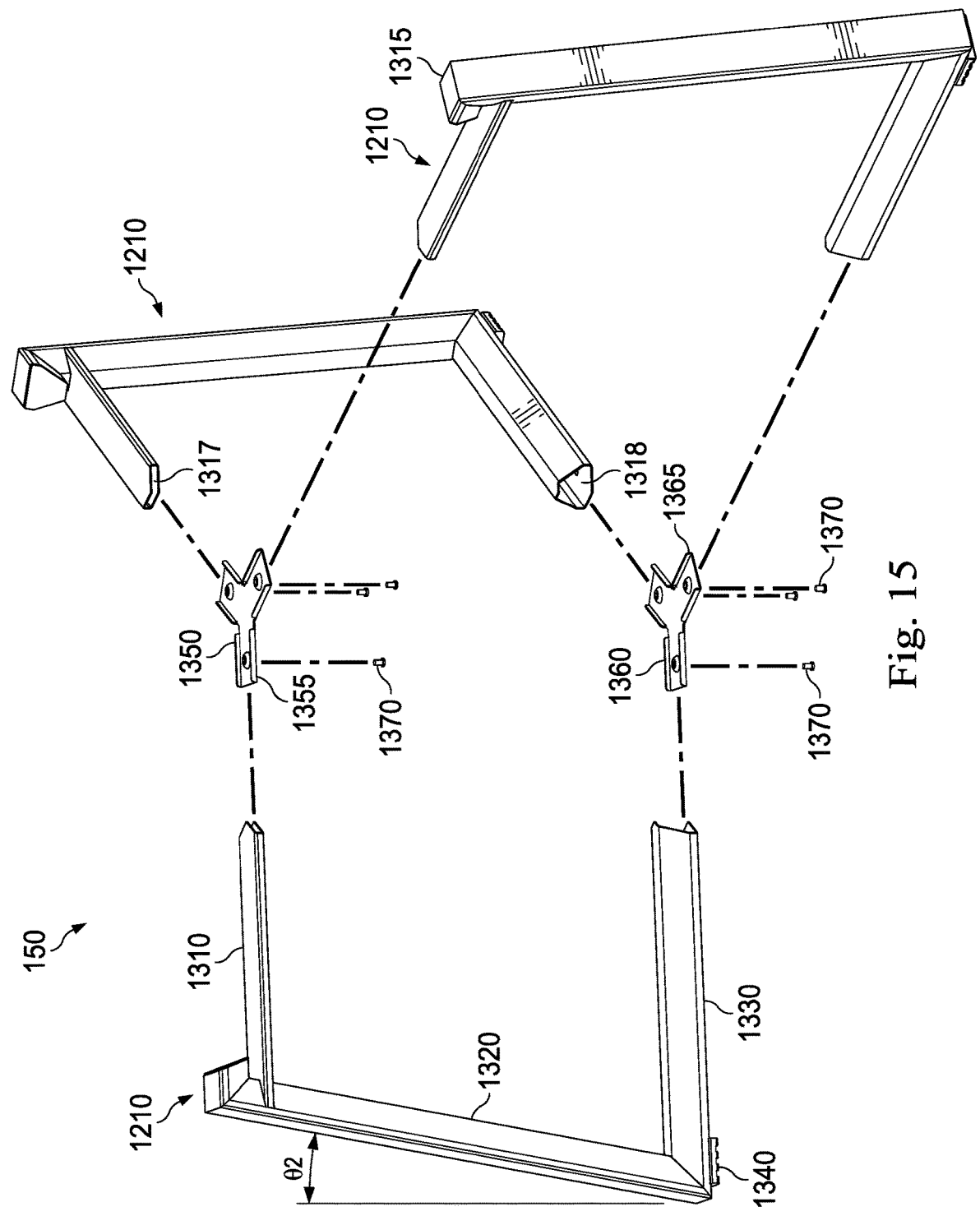
FIG. 15 is a perspective, exploded view of a grill stand of an example packable modular combustion grill, in accordance with at least one embodiment of the present disclosure.

FIG. 15 is a perspective, exploded view of a grill stand 150 of an example packable modular combustion grill 100, in accordance with at least one embodiment of the present disclosure. Each leg 1210 includes a shelf portion 1310, a lateral portion 1330, a foot pad 1340, and an upright portion 1320 that forms an angle θ2 with the vertical. In an example, a value of 10 degrees for θ2 provides enhanced stability over a value of 0 degrees, while also keeping the footprint smaller than would occur with values larger than 10 degrees. However, other values both larger and smaller (e.g., a range of −30 to +30 degrees) may be used instead or in addition. Since the shelf portion 1310 is shorter than the lateral portion 1330, a bottom portion of the grill stand 150 is wider than an upper portion of the grill stand 150. This may provide stability to the grill 100. As can be seen, the shelf portion 1310 includes a flat upper surface. The width of the upper surface may be sized to match indentations formed by the embossed features 248 of the outer wall base pan 240. That is, the shelf portion 1310 may be received directly into embossed recesses in the outer wall base pan 240, in order to permit the grill stove body 120 to dock securely and stably to the grill stand 150, and to decrease the steps required in the out-of-box assembly process for end users. In addition, the length of the shelf portion 1310 may be selected to provide a sturdy resting place for the grill body 120. The bumpers 1315, which extend above the shelf portion 1310, may be shaped to abut against the sidewalls of the outer wall base pan 240. This may prevent the grill body 120 from laterally displacing relative to the grill stand 150. In this example, the bumpers 1315 include an angled abutment face shaped to abut against the angled outer surface of the outer wall base pan 240. In yet other embodiments, the abutment face may be vertically inclined, or may abut against the outer side wall of the grill body 120. Because the grill stand 150 is free of mechanical fastening to the grill body 120, setup is easy, takedown, is easy, and movement/portability is easy.

In some embodiments, the grill stand 150 includes a top yoke plate 1350 and a bottom yoke plate 1360 that attach the legs 1210. The top yoke plate 1350 includes tabs 1355, each of which fits into a slot 1317 in the shelf portion 1310 of a leg 1210 and may be fixed in place using fasteners 1370. In some embodiments, the legs 1210 are attached at the bottom by the bottom yoke plate 1360 with tabs 1365 that fit into openings 1318 in the lateral portions 1330 of each leg 1210 and may be fixed in place using fasteners 1370.

The shelf portions 1310 may be sized and shaped to nest into embossed features of the outer wall base pan 240, while the bumpers 1315 contact the outer wall 210 to prevent lateral movement. Thus, the grill body 120 can dock or nest onto the grill stand 150 for use and can be readily removed from the grill stand 150 without tools. In addition, the legs 1210 can be removed from the grill stand 150, e.g., for transportation or storage of the packable modular combustion grill 100 in a flat-pack configuration.

Figure 16:
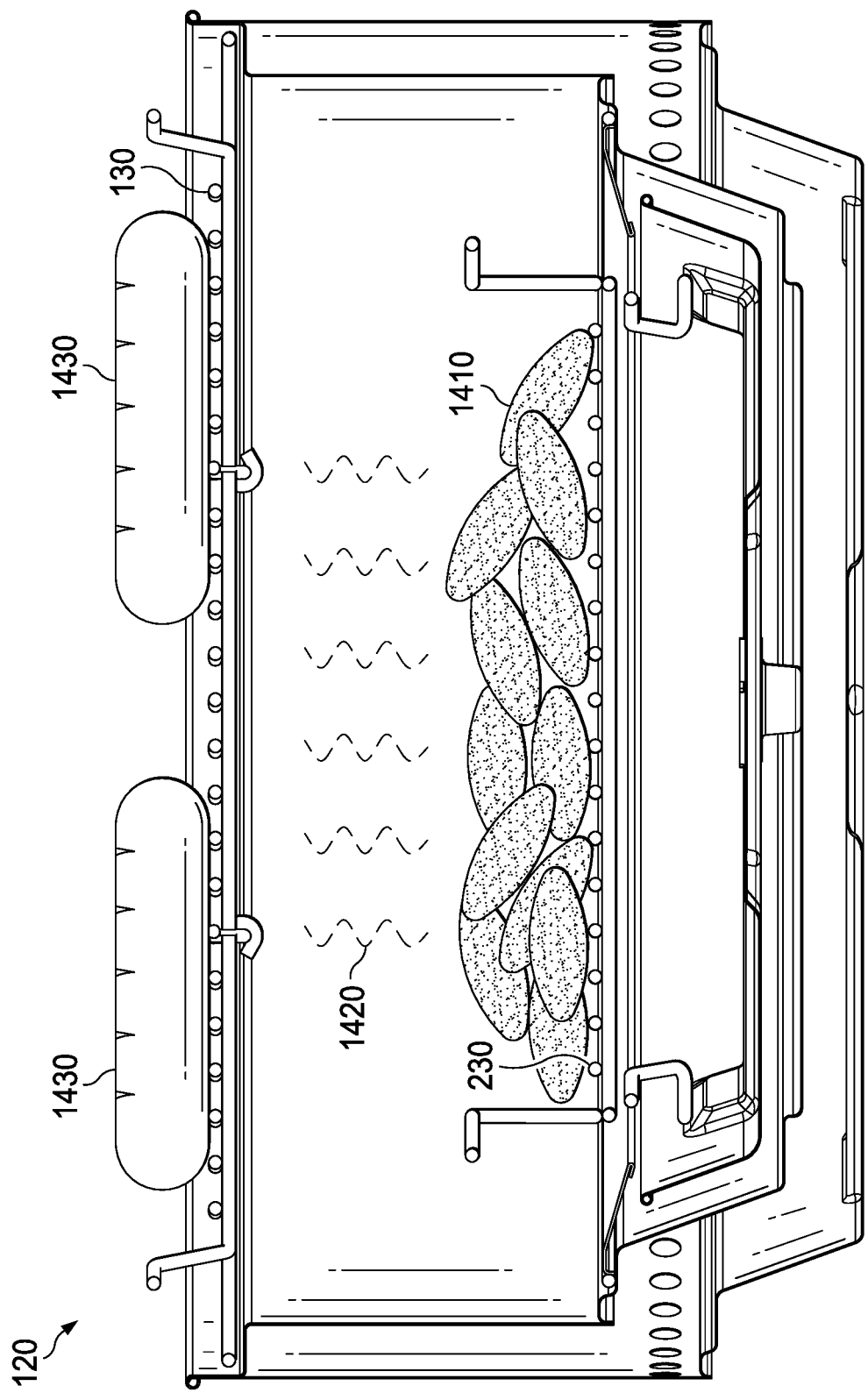
FIG. 16 is a diagrammatic, cross-sectional view of a direct-heat cooking process using an example packable modular combustion grill, in accordance with at least one embodiment of the present disclosure.

FIG. 16 is a diagrammatic, cross-sectional view of a direct-heat or radiant-heat cooking process using an example packable modular combustion grill 100, in accordance with at least one embodiment of the present disclosure. Visible are the grill body 120, grill grate 130, and coal grate 230, with a supply of combustible fuel 1410 (e.g., charcoal) positioned on the surface of the coal grate 230. The fuel 1410 emits radiant heat 1420 as it combusts, such that food items 1430 placed on the grill grate 130 can be cooked. Direct-heat or radiant-heat cooking processes may be preferred for patties, thin cuts of meat, low-mass vegetables, or for toasting of bread or marshmallows, and may occur with the grill lid 140 removed. Typically, the downward-facing side of the food items 1430 is cooked much more rapidly than the upward-facing side, and it is therefore common to flip or rotate the food items 1439 periodically until they are cooked to a desired level. For direct-heat or radiant-heat cooking, it may be desirable to have burning coals directly underneath each of the food items 1430 to be cooked. Thus, it may be desirable to cover most or all of the surface of the coal grate with combustible fuel 1410.

FIG. 17 is a diagrammatic, cross-sectional view of an indirect-heat cooking process using an example packable modular combustion grill 100, in accordance with at least one embodiment of the present disclosure. Visible are the grill body 120, grill grate 130, grill lid 140, and coal grate 230, with a supply of combustible fuel 1410 (e.g., charcoal) positioned on the surface of the coal grate 230. In this example, the lip 720 of the grill lid 140 nests onto the lip 440 of the inner wall 220 such that air does not flow between the lip 720 and the lip 440. In this configuration, the fuel 1410 emits convective heat 1520 as it combusts, such that the air trapped inside the grill body 120 by the grill lid 140 becomes heated. This convective heat 1420 can be used to cook food items 1430 placed on the grill grate 130. Indirect-heat or convective-heat cooking processes function more slowly than direct-heat or radiant-heat cooking processes, and may be preferred for thicker cuts of meat, poultry, and high-mass vegetables. For indirect-heat or convective-heat cooking, it may be undesirable to have burning coals directly underneath the food items 1430. Thus, it may be desirable to cover only a portion of the surface of the coal grate with combustible fuel 1410, and to position food items so that they are not directly above the fuel 1410. Depending on the conditions, it may be desired to have the vent cover 760 of the grill lid 140 fully open, partially open, or fully closed (see FIGS. 9 and 10), to permit varying levels of air circulation. With the vent cover 760 fully open, more cool air may be drawn in through the ventilation apertures 540 (see FIG. 8) and then expelled as hot air through the vent 750. This may tend to support more rapid combustion of the fuel 1410 and a higher overall internal temperature for the grill body 120, and may tend to allow smoke to escape, which may be desirable for certain cooking tasks. Conversely, with the vent cover 760 fully closed, less cool air may be drawn in through the ventilation apertures 540, resulting in slower combustion and a lower overall internal temperature for the grill body, along with trapping of smoke generated by the combustion of the fuel 1410, which may be desirable for other cooking tasks.

In some implementations, fuel packs may be particularly configured to be used with the grill 100. The fuel packs may contain a particular amount of fuel to cook particular types of food. For example, in some embodiments, a relatively larger fuel pack may contain fuel sufficient to bring the grill to a particular higher range of cooking temperature for particular food types, while a relatively smaller fuel pack may contain fuel sufficient to bring the grill to a particularly lower range of cooking temperature for different particular food types. In other embodiments, different sizes and/or shapes of fuel pack may include similar amounts of fuel to one another, but may produce different distribution of the fuel on the coal grate.

Figure 18A:
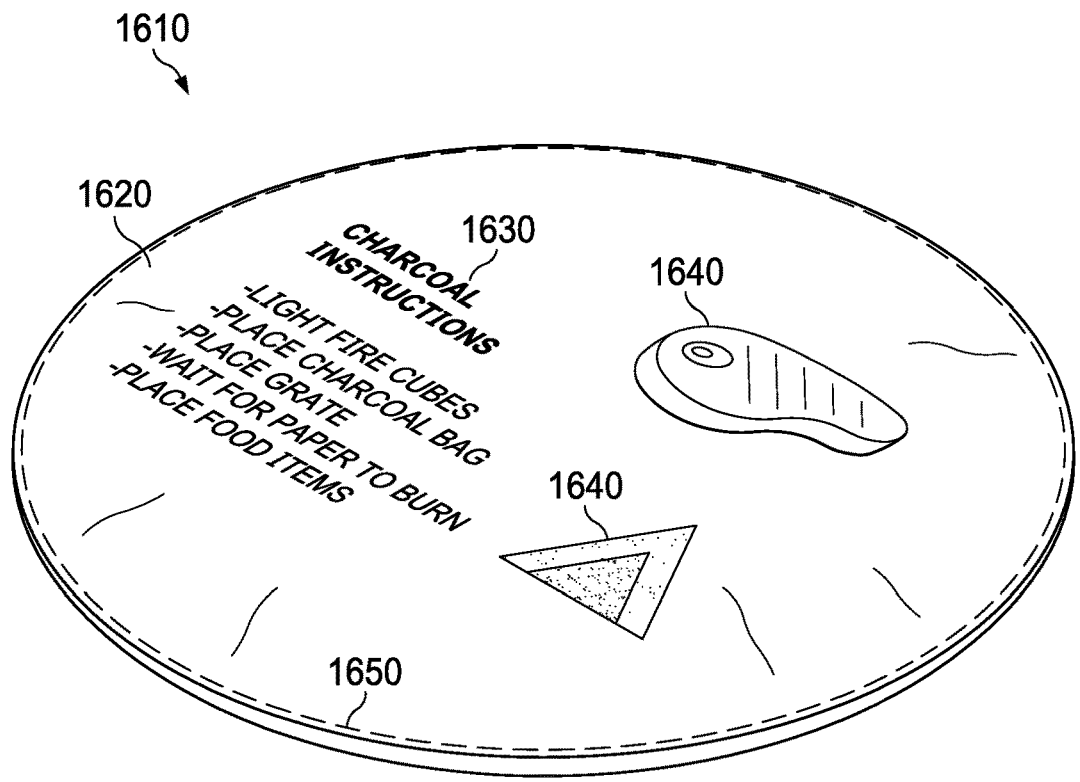
FIG. 18A is a perspective view of an example large fuel pack for a packable modular combustion grill, in accordance with at least one embodiment of the present disclosure.

FIG. 18A is a perspective view of an example large fuel pack 1610 for a packable modular combustion grill 100, in accordance with at least one embodiment of the present disclosure. The large fuel pack 1610 includes a quantity of fuel 1410 (FIG. 17) sufficient to cover most or all of the coal grate 230 to a desired depth, and a bag 1620 made of combustible material (e.g., paper, burlap, cloth, etc.) sized and shaped to cover most or all of the coal grate 230. This configuration may be desirable for direct-heat or radiant-heat cooking as shown for example in FIG. 16. In some embodiments, ignition of the bag 1620 may be sufficient to ignite the fuel 1410, and the dimensions of the bag 1620 and the distribution of fuel within the bag 1620 may be selected such that little or no rearrangement of the fuel 1410 is required before or during the combustion process, in order to support a direct heat cooking process as shown in FIG. 16.

The bag may include a seam 1650 (e.g., a stitched, stapled, or glued seam), text 1630 (e.g., instructions, branding information, etc.), and pictograms 1640 (e.g., instructions, branding information, etc.). Although the large fuel pack 1610 is depicted in this example as circular, other shapes may be employed, including but not limited to triangular, square, hexagonal or octagonal. In some implementations, the large fuel pack 1610 is shaped and dimensioned similar to the shape and dimensions of the surface of the coal grate 230, such that it covers most or all of (e.g., 90-100% of) the coal grate, and such that once the bag 1620 has burned away, the fuel 1410 covers most or all of (e.g., 90-100% of) the coal grate.

Figure 18B:
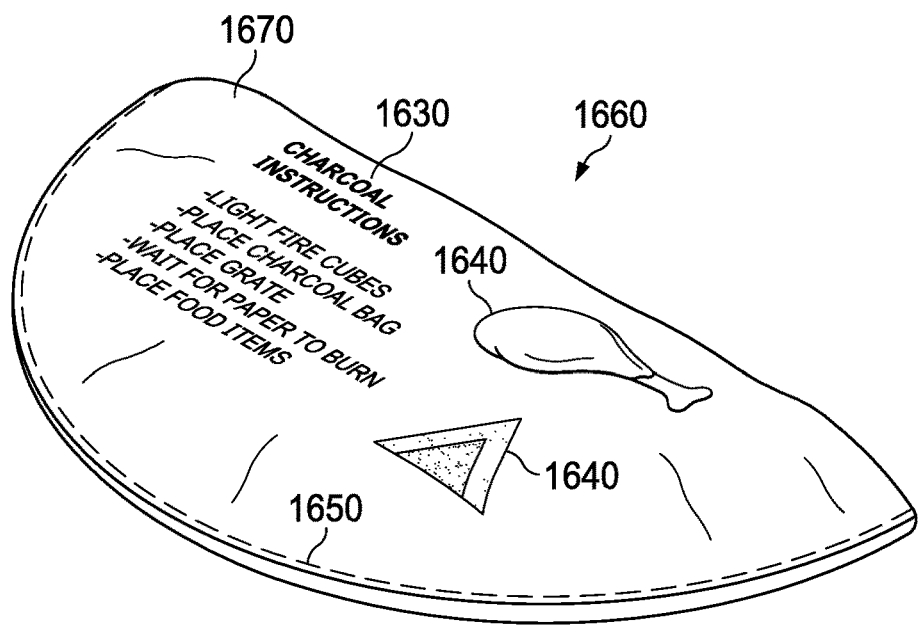
FIG. 18B is a perspective view of an example small fuel pack for an example packable modular combustion grill, in accordance with at least one embodiment of the present disclosure.

FIG. 18B is a perspective view of an example small fuel pack 1660 for an example packable modular combustion grill 100, in accordance with at least one embodiment of the present disclosure. The small fuel pack 1660 is similar to the large fuel pack 1610 of FIG. 18A, except that the small fuel pack bag 1670 is sized and shaped to cover approximately half of (e.g., 40-60% of) the coal grate 230, rather than approximately all of the coal grate 230 as with the large fuel pack 1610. This may be desirable for indirect-heat or convective-heat cooking, as shown for example in FIG. 17. Although the small fuel pack 1660 is depicted in this example as semicircular, other shapes may be employed, including but not limited to rectangular. Because the different shaped fuel packs may produce a different distribution of fuel, the user may be able to heat and cook without taking time to manually distribute the fuel on the coal grate. Accordingly, the distribution may be selected to provide cooking conditions that are particularly desired for particular types of food. This is further described below.

Figure 19A:
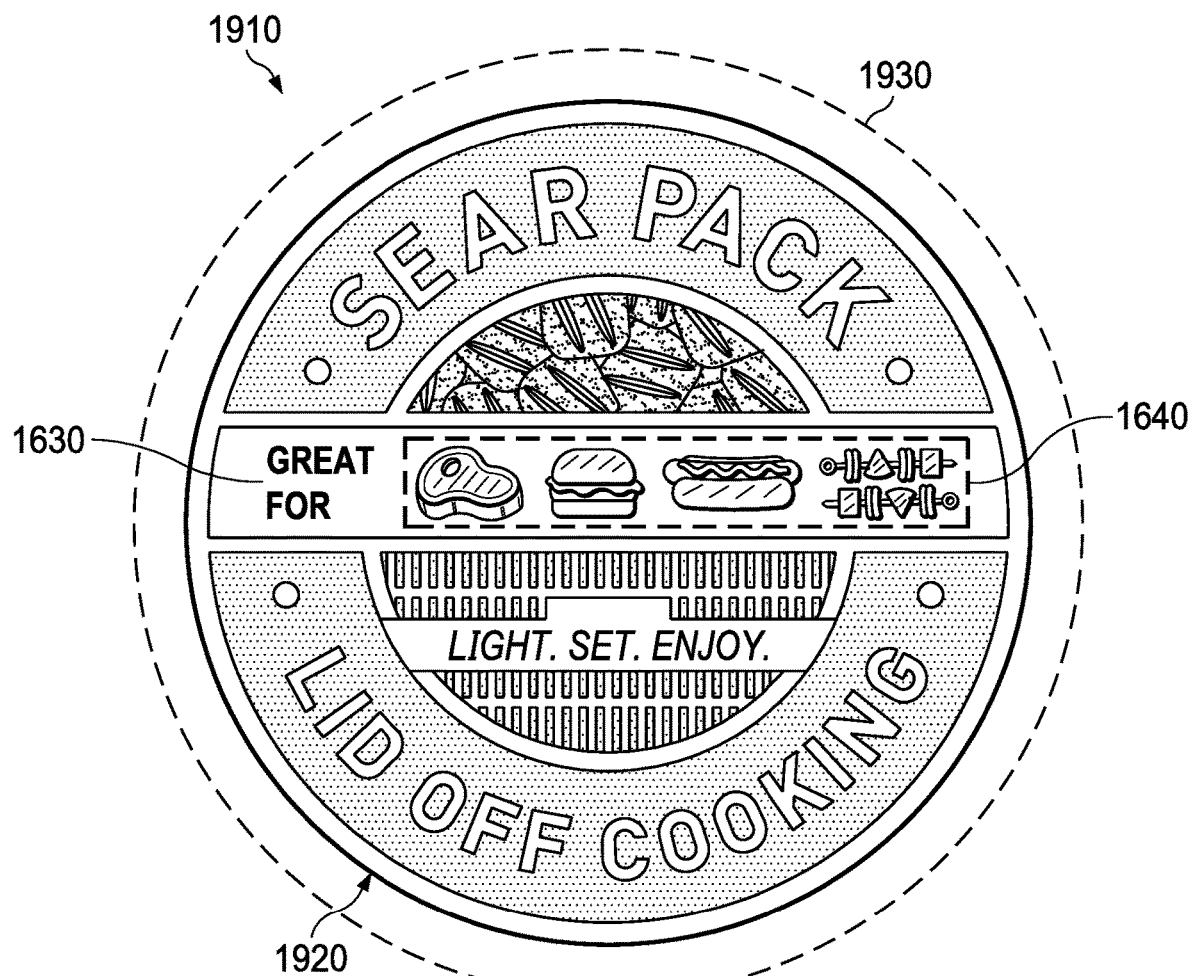
FIG. 19A is a top view of example package labeling of a large fuel pack for a packable modular combustion grill, in accordance with at least one embodiment of the present disclosure.

FIG. 19A is a top view of example package labeling 1910 of a large fuel pack 1610 for a packable modular combustion grill 100, in accordance with at least one embodiment of the present disclosure. Visible are a label 1920 incorporating text 1630 and pictograms 1640, and a dotted line 1930 representing the dimensions of the fuel pack bag 1620 as shown for example in FIG. 18A. In some embodiments, the shape and dimensions of the label 1920 may be similar to the shape and dimensions of the fuel pack bag 1620, which may be similar to the shape and dimensions of the top surface of the coal grate 230. Importantly, the pictograms 1640 provide visual instruction for a user to choose the properly sized pack for a particular cooking application. For example, the image of the food types pictograms 1640 in FIG. 19A show meats that might be cooked over high temperature direct heat. Particularly, FIG. 19A includes food type pictograms 1640 shows images of a steak, a burger, a sausage, or kebab. In other examples, the image of the food types pictograms 1640 in FIG. 19A show meats that might be cooked over high temperature direct heat with a distribution over most or all the coal grate.

This may help users intuitively understand the purpose, use, and advantages of the large fuel pack 1610 for direct-heat cooking. In some embodiments, the text 1630 indicates that cooking should be performed with the grill lid 140 removed, and the pictograms 1640 include at least one image of a steak, burger, sausage, or kebab.

Figure 19B:
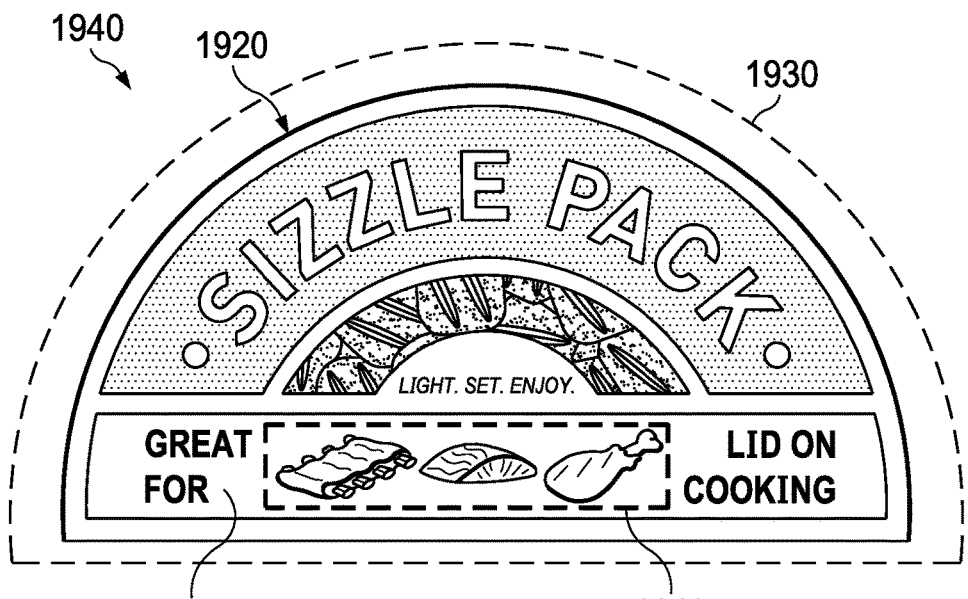
FIG. 19B is a top view of example package labeling of a small fuel pack for a packable modular combustion grill, in accordance with at least one embodiment of the present disclosure.

FIG. 19B is a top view of example package labeling 1940 of a small fuel pack 1660 for a packable modular combustion grill 100, in accordance with at least one embodiment of the present disclosure. Visible are a label 1920 incorporating text 1630 and pictograms 1640, and a dotted line 1930 representing the dimensions of the fuel pack bag 1670 as shown for example in FIG. 18B. In some embodiments, the shape and dimensions of the label 1920 may be similar to the shape and dimensions of the small fuel pack bag 1670, which may be similar to the shape and dimensions of approximately one half of the top surface of the coal grate 230. This may help users intuitively understand the purpose, use, and advantages of the small fuel pack 1660 for indirect-heat cooking. In some embodiments, the text 1630 indicates that cooking should be performed with the grill lid 140 on, and the pictograms 1640 include at least one image of ribs, fish, or poultry such as chicken. In other examples, the image of the food types pictograms 1640 in FIG. 19B show meats that might be cooked over lower temperature or indirect heat with a distribution over only approximately half of (e.g., 40-60% of) the coal grate. This pre-established fuel distribution packages making up the fuel packs may make cooking of the particular meat types easier without requiring manual stacking or arrangement of the burning fuel. Depending on the embodiment, a small fuel pack 1660 may contain an identical, similar, or different amount of fuel than a large fuel pack 1610.

Figure 20:
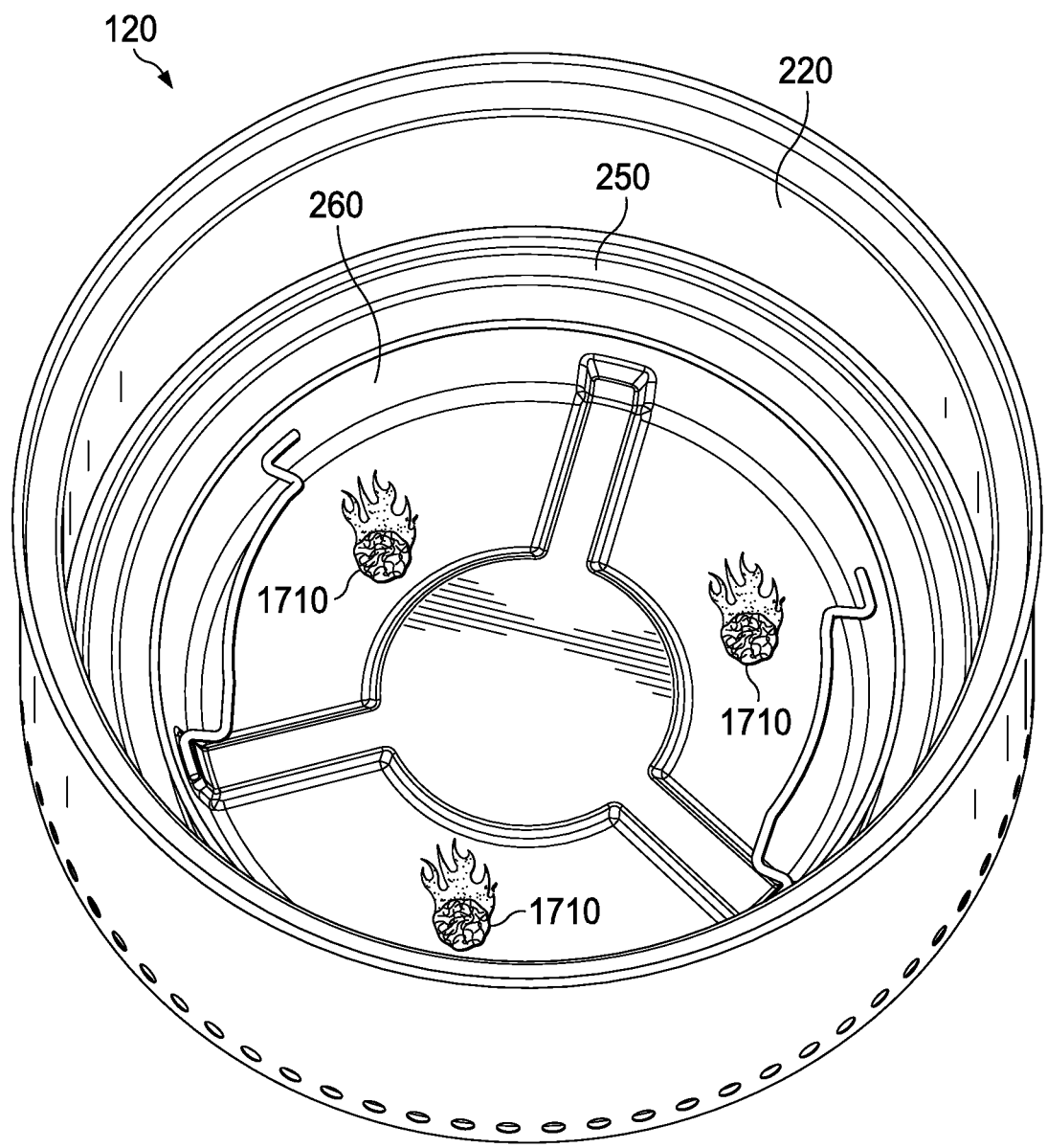
FIG. 20 is a top perspective view of a plurality of fire lighters in the ash pan of an example packable modular combustion grill, in accordance with at least one embodiment of the present disclosure.

FIG. 20 is a top perspective view of a plurality of fire lighters 1710 positioned in the ash pan 260 of an example packable modular combustion grill 100, in accordance with at least one embodiment of the present disclosure. Also visible are the coal grate nest pan 250 and inner wall 220. The fire lighters 1710 may comprise any combustible material capable of burning with an open flame for a period of time sufficient to support the ignition of fuel 1410 within a fuel pack 1610 or 1660. Such materials may include, but are not limited to combinations of cellulose, wax, sugar, and alcohol-based or petroleum-based gels or liquids. Fire lighters 1710 may be ignited with matches, butane lighters or torches, sparks, focused sunlight, or other tools or methods.

In some instances, placing and igniting one or more fire lighters 1710 in the ash pan 260 may be the first step in heating the packable modular combustion grill 100 for cooking.

Figure 21:
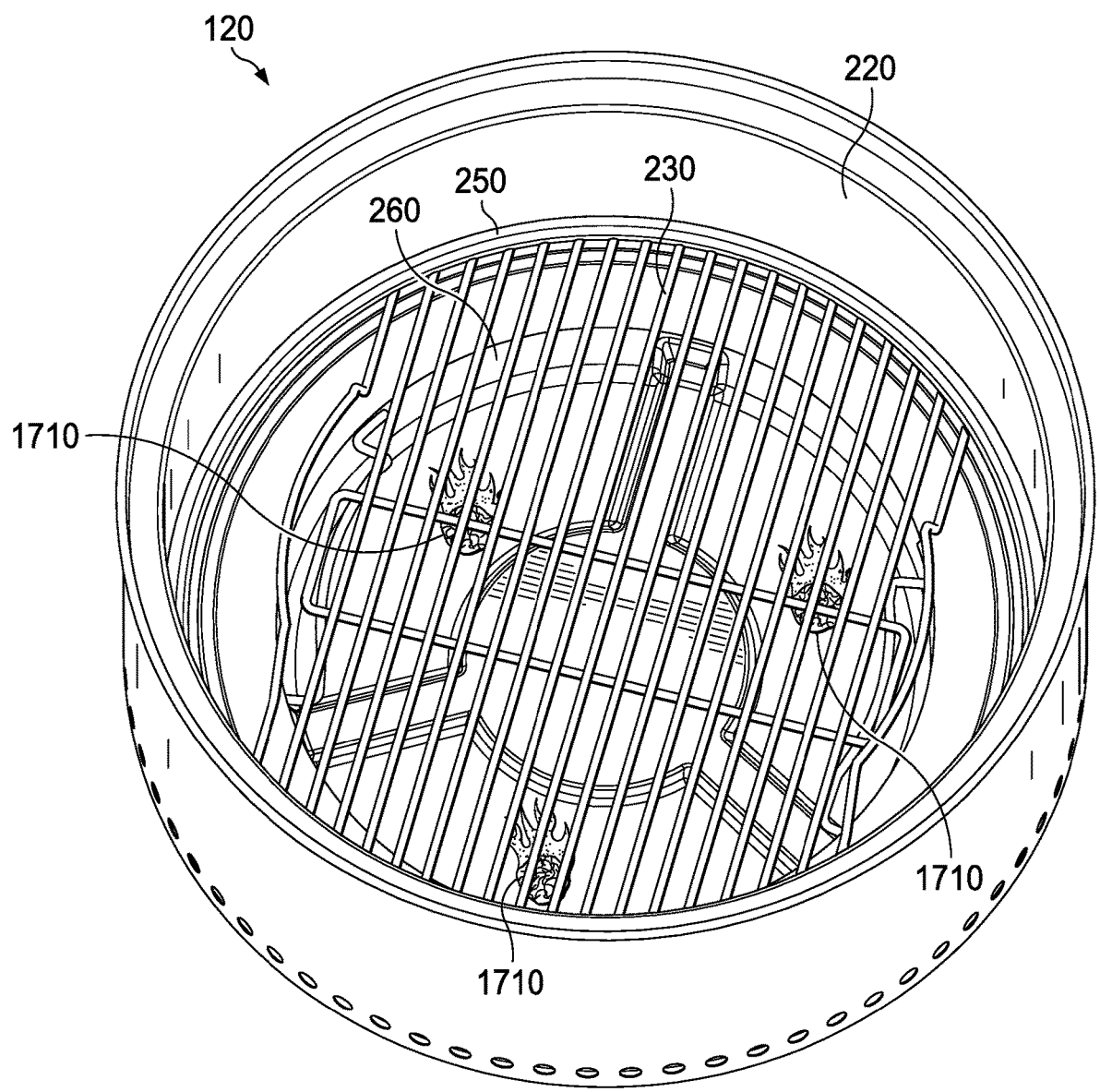
FIG. 21 is a top perspective view of the example packable modular combustion grill of FIG. 20, with the coal grate lowered into place above the ash pan, in accordance with at least one embodiment of the present disclosure.

FIG. 21 is a top perspective view of the example packable modular combustion grill 100 of FIG. 20, with the coal grate 230 lowered into place on the coal grate nest pan 250, above fire lighters 1710 that are burning in the ash pan 260, in accordance with at least one embodiment of the present disclosure. Placement of the coal grate 230 provides a platform to add combustible fuel 1410 to the packable modular combustion grill 100. Also visible is the inner wall 220.

Figure 22:
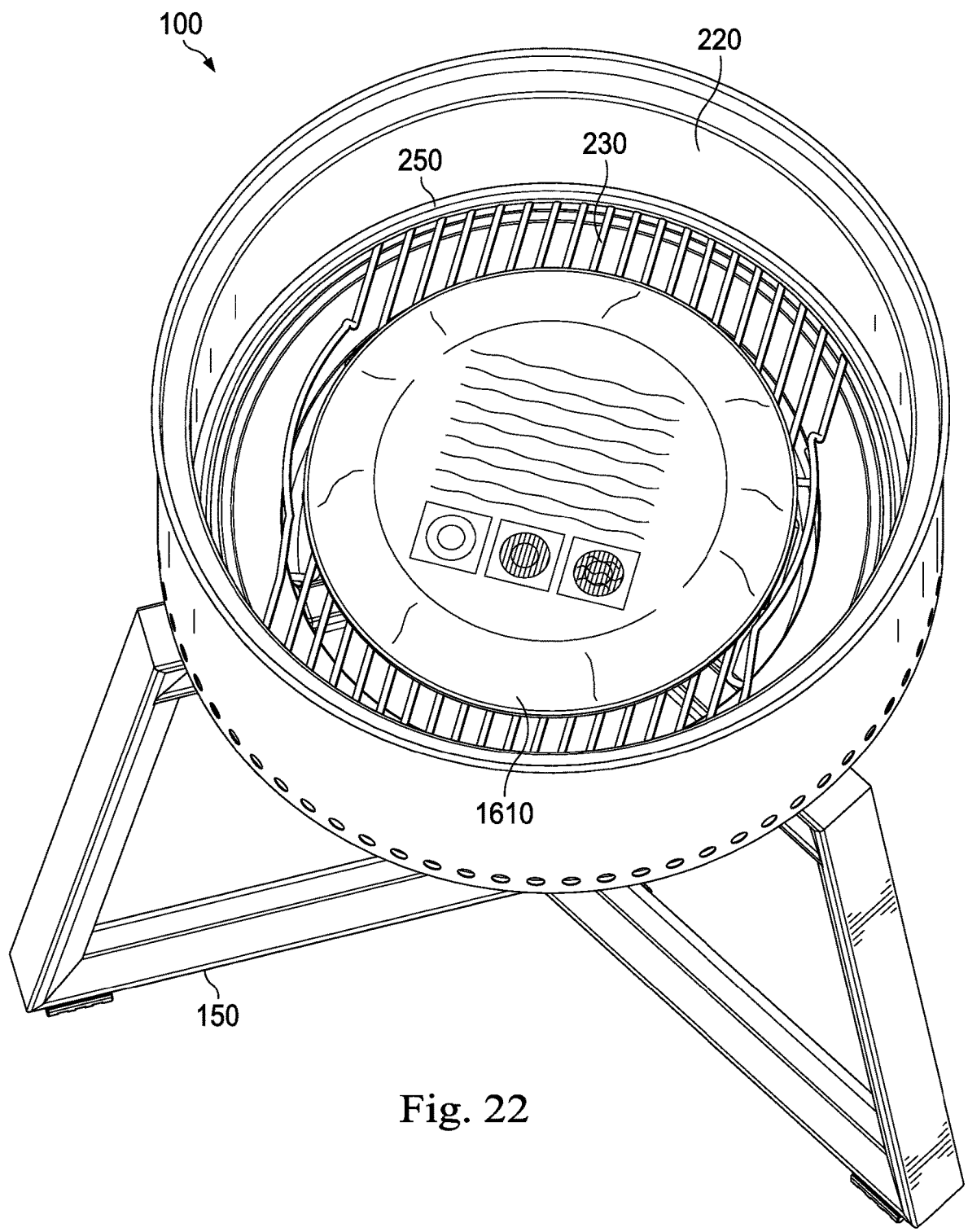
FIG. 22 is a top perspective view of the example packable modular combustion grill of FIG. 21, with a fuel pack placed on top of the coal grate, with the coal grate lowered into place above the ash pan, in accordance with at least one embodiment of the present disclosure.

FIG. 22 is a top perspective view of the example packable modular combustion grill 100 of FIG. 21, with a large fuel pack 1610 placed on top of the coal grate 230, with the coal grate 230 in place on the coal grate nest pan 250, above the burning fire lighters 1710 placed in the ash pan 260, in accordance with at least one embodiment of the present disclosure. In this configuration, the burning fire lighters 1710 may ignite the bag 1620 or 1670 of the fuel pack 1610 or 1660, which may in turn ignite the combustible fuel 1410 within the bag 1620 or 1670. Also visible are the inner wall 220 and a portion of the grill stand 150. It should be noted that in some cases, it may be possible for users to ignite the bag 1620 or 1670 of the fuel pack 1610 or 1660 directly, without the need for fire lighters 1710.

Figure 23:
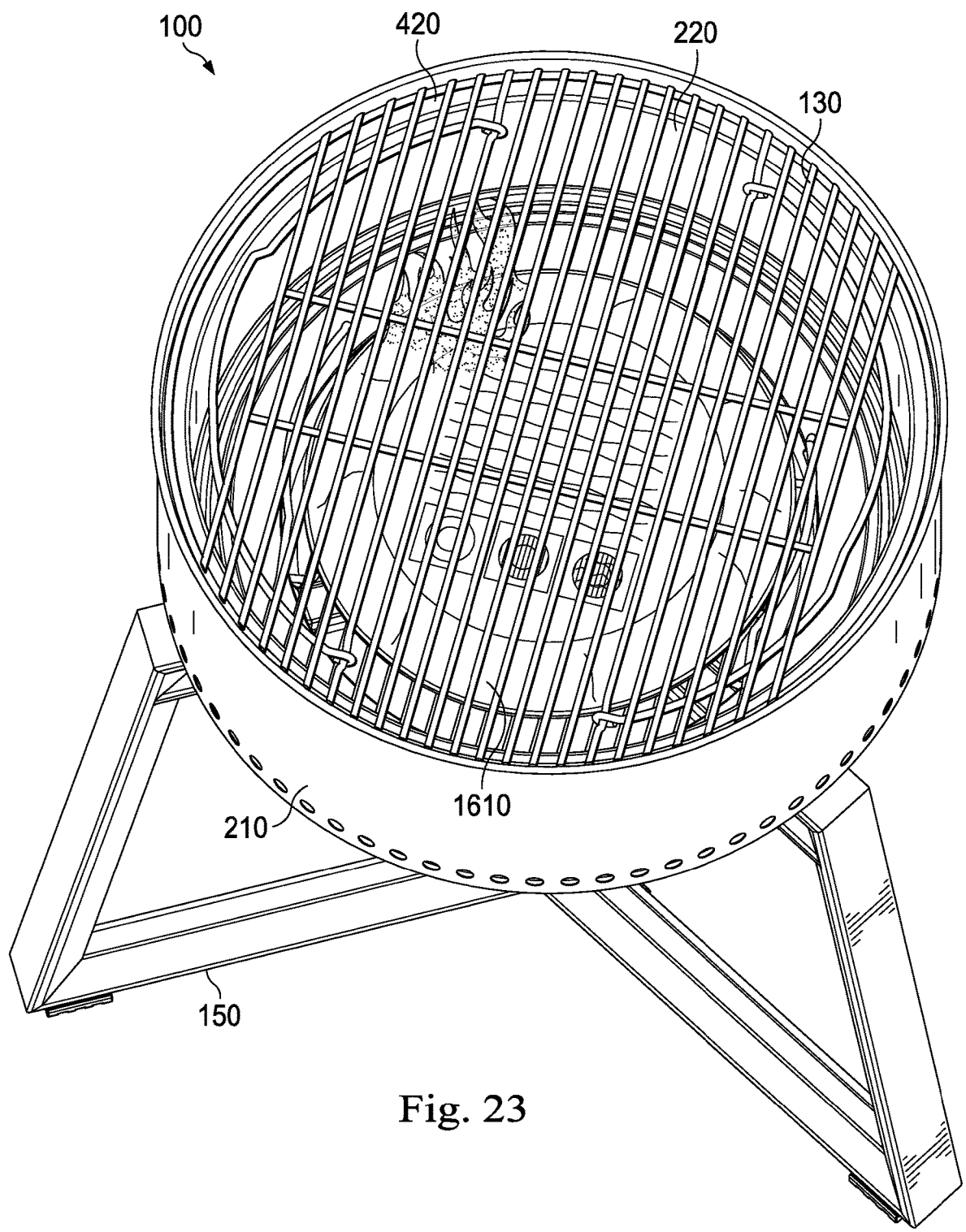
FIG. 23 is a is a top perspective view of the example packable modular combustion grill of FIG. 22, with the grill grate lowered into place atop the inner wall collar, in accordance with at least one embodiment of the present disclosure.

FIG. 23 is a is a top perspective view of the example packable modular combustion grill 100 of FIG. 22, with the grill grate 130 lowered into place atop the top collar 420 of the inner wall 220, in accordance with at least one embodiment of the present disclosure. Once the bag 1620 or 1670 of the fuel pack 1610 or 1660 has been ignited sufficiently to ignite the fuel 1410 within the fuel pack 1610 or 1660, the grill grate 130 may be placed onto the top collar 420 so that it can begin heating up for cooking. Also visible are the outer wall 210 and part of the grill stand 150.

Figure 24:
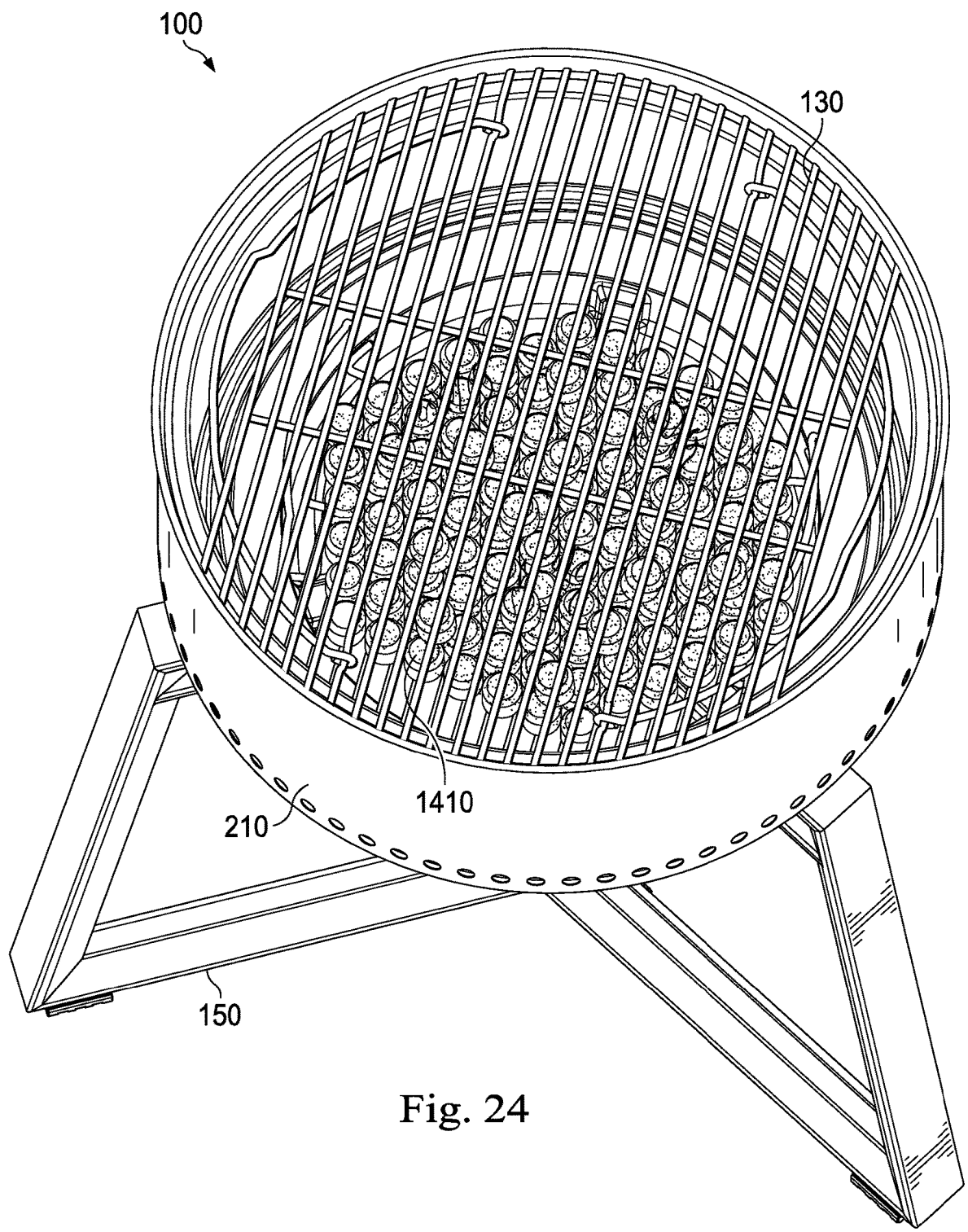
FIG. 24 is a top perspective view of the example packable modular combustion grill of FIG. 23, with the wrapper of the fuel pack now combusted away and the fuel forming a coal bed, in accordance with at least one embodiment of the present disclosure.

FIG. 24 is a top perspective view of the example packable modular combustion grill 100 of FIG. 23, with the wrapper or bag 1620 or 1670 of the fuel pack 1610 or 1660 now combusted away, and the fuel 1410 forming a coal bed, in accordance with at least one embodiment of the present disclosure. In some cases, it may be desirable to preheat the packable modular combustion grill or permit the fuel 1410 to burn for a period of time (e.g., 15 minutes), before cooking begins, to heat the grill grate 130 and to ensure even combustion and even distribution of radiant heat.

Figure 25:
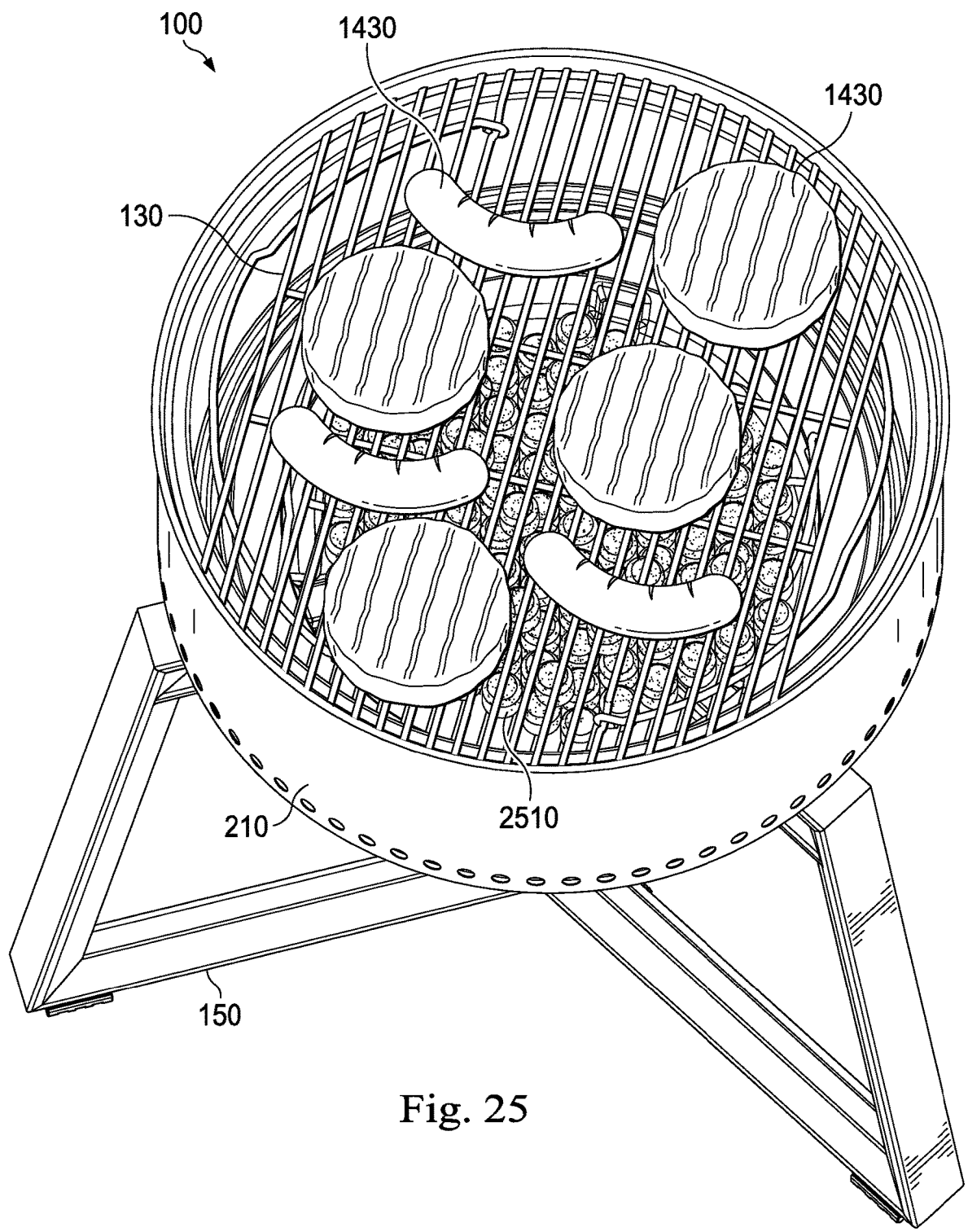
FIG. 25 is a top perspective view of the example packable modular combustion grill of FIG. 24, with food items placed on the grill grate to be heated by the coal bed, in accordance with at least one embodiment of the present disclosure.

FIG. 25 is a top perspective view of the example packable modular combustion grill of FIG. 24, with food items 1430 placed on the grill grate 130 such that they can be cooked or heated by the coal bed 2510 that has formed by combustion of the fuel 1410, in accordance with at least one embodiment of the present disclosure.

Figure 26:
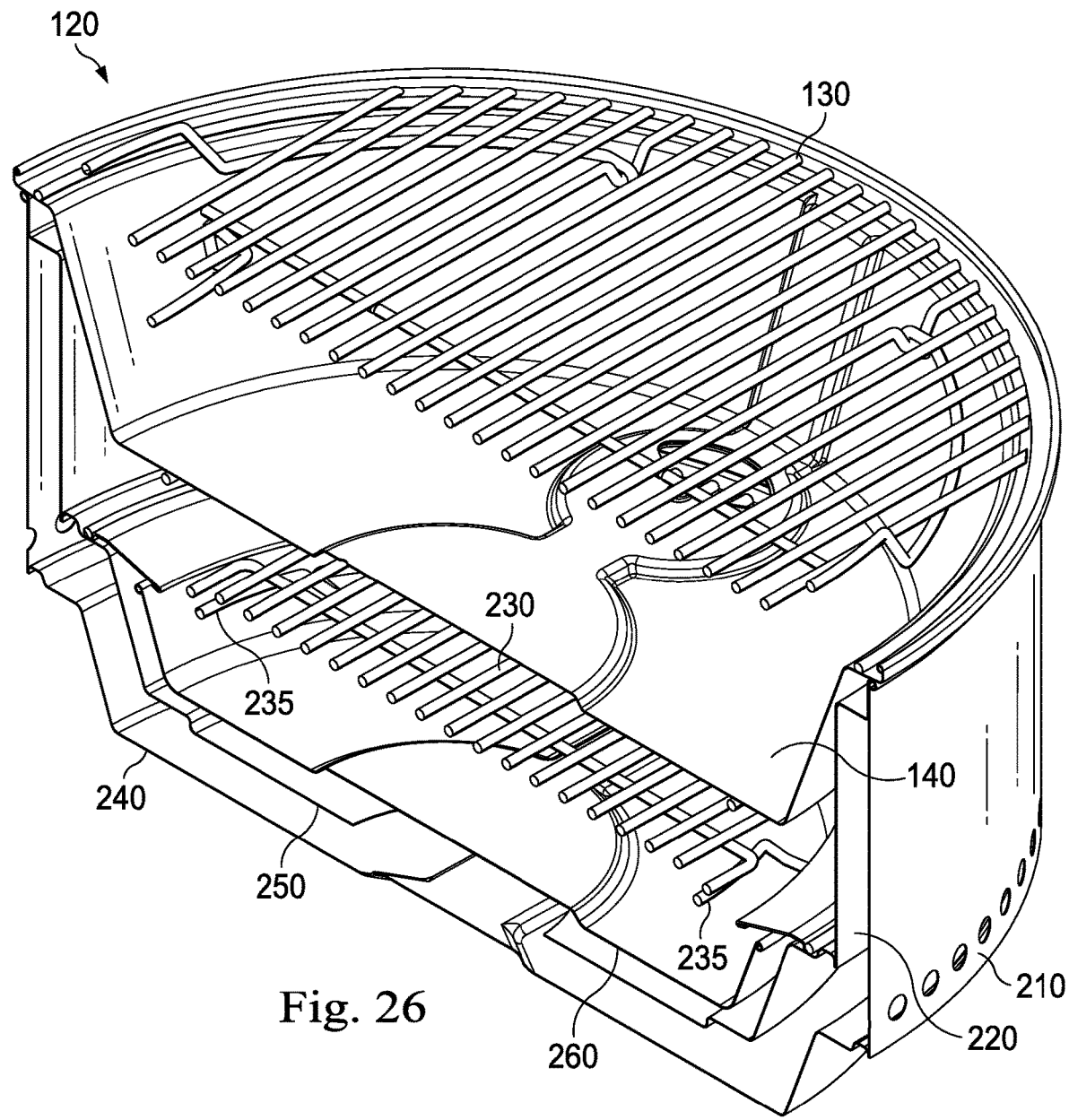
FIG. 26 is a cross-sectional view of an example packable modular combustion grill in a storage configuration.

FIG. 26 is a cross-sectional view of an example packable modular combustion grill 100 in a storage configuration. In this configuration, the grill lid 140 is inverted and stored within the grill body 120, with the lip 720 of the grill lid 140 nesting onto the lip 440 of the inner wall 220.

As will be readily appreciated by those having ordinary skill in the art after becoming familiar with the teachings herein, the present disclosure fills a long-standing need, by improving ease of use for wood-fueled and charcoal-fueled grilling stoves, to grill food through radiant and/or convective heat. For example, a user may establish a coal bed of a desired size, with predictable and repeatable thermal properties, without needing to measure fuel quantities, manually distribute fuel evenly across a combustion surface, or add combustion accelerants to the fuel. The double-walled design of the grilling stove also permits the outer surfaces of the grilling stove to be substantially cooler than the inner surfaces while the grilling stove is in operation, and the hinged grill grate permits access to the coal bed as necessary, without the need to remove the grill grate from the grill stove. A utensil hanger permits ready access to cooking utensils, while a lid hanger permits the lid to be accessible while the grilling stove is in use. These features allow even inexperienced users to obtain desired cooking results repeatably, with minimal risk of contamination, injury, or fire.

A number of variations are possible on the examples and embodiments described above. For example, the dimensions or materials of the packable modular combustion grill may be different than described herein. The circular shape of the grill body may be different than shown herein, including but not limited to square, rectangular, hexagonal, octagonal, or semicircular. Certain aspects of the technology described herein may be applied to stoves of other kinds, including fire pits, camp stoves, gas grills, gas stoves, and electric stoves. In some implementations, the grill body may be fixedly rather than removably docked to the grill stand. In other cases, the grill body may be used without a grill stand, but rather placed directly onto the ground or other heat-resistant surface.

Accordingly, the logical operations making up the embodiments of the technology described herein are referred to variously as operations, steps, objects, elements, components, or modules. Furthermore, it should be understood that these may occur or be performed or arranged in any order, unless explicitly claimed otherwise or a specific order or arrangement is inherently necessitated by the claim language.

All directional references e.g., upper, lower, inner, outer, upward, downward, left, right, lateral, front, back, top, bottom, above, below, vertical, horizontal, clockwise, counterclockwise, proximal, and distal are only used for identification purposes to aid the reader's understanding of the claimed subject matter, and do not create limitations, particularly as to the position, orientation, or use of the packable modular combustion grill. Connection references, e.g., attached, coupled, connected, and joined are to be construed broadly and may include intermediate members between a collection of elements and relative movement between elements unless otherwise indicated. As such, connection references do not necessarily imply that two elements are directly connected and in fixed relation to each other. The term "or" shall be interpreted to mean "and/or" rather than "exclusive or." The word "comprising" does not exclude other elements or steps, and the indefinite article "a" or "an" does not exclude a plurality. Unless otherwise noted in the claims, stated values shall be interpreted as illustrative only and shall not be taken to be limiting.

The above specification, examples and data provide a complete description of the structure and use of exemplary embodiments of the packable modular combustion grill as defined in the claims. Although various embodiments of the claimed subject matter have been described above with a certain degree of particularity, or with reference to one or more individual embodiments, those skilled in the art could make numerous alterations to the disclosed embodiments without departing from the spirit or scope of the claimed subject matter. Still other embodiments are contemplated. It is intended that all matter contained in the above description and shown in the accompanying drawings shall be interpreted as illustrative only of particular embodiments and not limiting. Changes in detail or structure may be made without departing from the basic elements of the subject matter as defined in the following claims.

What is claimed is:

1. A grill stove, comprising:
   a kettle comprising:
   an outer wall including a top portion with a top edge, a bottom portion width a bottom edge, and a ventilation aperture,
   an inner wall including a top portion with a top edge and a bottom portion with a bottom edge,
   a top collar extending between the inner wall and the outer wall, the top collar connecting the top portion of the outer wall to the top portion of the inner wall, the inner wall and the outer wall being spaced apart to form a gap therebetween,
   a base pan attached to the outer wall and forming a bottom of the kettle, and
   a nest pan having an edge and a ventilation aperture, the edge of the nest pan being attached to the bottom portion of the inner wall and disposed above the base pan, the nest pan and the base pan being spaced apart to form a gap therebetween, the ventilation aperture of the nest pan being in fluid communication with the ventilation aperture of the outer wall;
   an ash pan removably positionable above the nest pan; and
   a coal grate removably disposed above the ash pan and the nest pan.

2. The grill stove of claim 1, wherein the inner wall further includes a top lip positioned at an outer perimeter of the top collar.

3. The grill stove of claim 1, wherein a height of the inner wall is less than a height of the outer wall, and wherein the ventilation aperture of the outer wall comprises a plurality of apertures positioned within the outer wall at an elevation lower than the bottom edge of the inner wall.

4. The grill stove of claim 1, wherein the ventilation aperture of the nest pan comprises a central opening in a bottom surface of the nest pan.

5. The grill stove of claim 1, wherein at least one of the ash pan, the nest pan, or the base pan includes radial embossed features.

6. The grill stove of claim 5, wherein at least some of the radial embossed features are configured to nest with features of a grill stand.

7. The grill stove of claim 1, wherein the outer wall, inner wall, base pan, nest pan, ash pan, and coal grate comprise stainless steel.

8. The grill stove of claim 1, wherein the coal grate comprises at least one handle, a downward-sloping funnel rim, and a grating.

9. The grill stove of claim 1, wherein the base pan comprises a bottom and sides extending upwardly from the bottom.

10. A grill stove, comprising:
    an outer wall including a top portion having a top edge, a bottom portion having a bottom edge, and a plurality of ventilation apertures disposed along the bottom portion, the outer wall having a first height and defining a central axis and being circular in a cross-section perpendicular to the central axis;
    an inner wall including a top portion having a top edge and a bottom portion having a bottom edge, the inner wall being coaxial with the outer wall and being devoid of ventilation apertures, the inner wall having a second height less than the first height, the inner wall defining a central chamber;
    a bottom attached to the outer wall and forming a bottom of the grill stove;
    a nest layer above the bottom and defining an air flow passage in communication with at least one ventilation aperture of the plurality of ventilation apertures;
    a fuel grate above the nest layer for supporting a fuel; and
    a top collar extending laterally between the inner wall and the outer wall, the top collar connecting the top portion of the outer wall to the top portion of the inner wall, the inner wall and the outer wall being spaced apart to form a gap therebetween, the ventilation apertures being in communication with the gap and in communication with a space below the nest layer, the space below the nest layer in communication with the central chamber.

11. The grill stove of claim 10, wherein the top collar is a flange extending radially from the inner wall to the top portion of the outer wall.

12. The grill stove of claim 10, wherein the bottom comprises a plurality of grooves shaped to receive legs of a grill stand.

13. The grill stove of claim 12, comprising a grill stand having substantially horizontal support arms, the bottom being configured to rest on the support arms.

14. The grill stove of claim 10, comprising:
    a funnel disposed below the fuel grate, the funnel having a central opening for passage of burnt fuel and configured to the burnt fuel radially inward toward the central axis.

15. The grill stove of claim 14, comprising an ash pan having a width wider than a width of the central opening of the funnel.

16. The grill stove of claim 15, wherein the nest layer comprises a nest pan having an edge and a central ventilation aperture, the edge of the nest pan being attached to the bottom portion of the inner wall and disposed above the bottom, the nest pan and the bottom being spaced apart to form a gap therebetween, the ventilation aperture of the nest pan being in fluid communication with the ventilation aperture of the outer wall.

17. The grill stove of claim 15, comprising a grill grate disposed above the fuel grate, the grill grate comprising an access door and a handle for opening the access door to provide access to the central chamber.

18. A grill stove, comprising:
    an inner wall and a floor portion defining a central chamber;
    a removable fuel grate in the central chamber and disposed above the floor portion to support a fuel for heating the grill stove, and
    a removable funnel in the central chamber disposed below the fuel grate, the funnel having a central opening for passage of burnt fuel and configured to direct the burnt fuel radially inwardly, the central opening having a first width; and
    an ash pan disposed in the central chamber below the funnel, the ash pan having an opening for receiving burnt fuel, the opening having a second width larger than the first width,
    wherein the removable funnel is vertically removable through the central chamber.

19. The grill stove of claim 18, wherein the removable funnel is fixed to the fuel grate and removable from the central chamber with the fuel grate.

20. The grill stove of claim 18, wherein the fuel grate comprises a handle for grasping by a user and the ash pan comprises a handle for grasping by a user.

21. The grill stove of claim 18, comprising a lid sized to be inverted and received in the central chamber for storage.

22. The grill stove of claim 18, wherein the inner wall is cylindrical.

\* \* \* \* \*